(12) United States Patent
Axelbaum et al.

(10) Patent No.: US 11,029,020 B2
(45) Date of Patent: Jun. 8, 2021

(54) OXY-COMBUSTION PROCESS WITH MODULAR BOILER DESIGN

(71) Applicants: Richard Axelbaum, St. Louis, MO (US); Zhiwei Yang, St. Louis, MO (US); Akshay Gopan, St. Louis, MO (US)

(72) Inventors: Richard Axelbaum, St. Louis, MO (US); Zhiwei Yang, St. Louis, MO (US); Akshay Gopan, St. Louis, MO (US)

(73) Assignee: Washington University, St. Louis, MO (US)

(*) Notice: Subject to any disclaimer, the term of this patent is extended or adjusted under 35 U.S.C. 154(b) by 0 days.

(21) Appl. No.: 16/431,108

(22) Filed: Jun. 4, 2019

(65) Prior Publication Data

US 2019/0368722 A1    Dec. 5, 2019

Related U.S. Application Data

(60) Provisional application No. 62/680,196, filed on Jun. 4, 2018.

(51) Int. Cl.
*F22B 1/22* (2006.01)
*F01K 23/10* (2006.01)
*F23L 7/00* (2006.01)

(52) U.S. Cl.
CPC ............... *F22B 1/22* (2013.01); *F01K 23/10* (2013.01); *F23L 7/007* (2013.01); *F23C 2202/00* (2013.01); *F23C 2202/50* (2013.01); *F23J 2215/50* (2013.01); *F23L 2900/07007* (2013.01)

(58) Field of Classification Search
CPC ....... F23L 7/007; F23C 6/042; F23C 9/00–08; F23C 2202/00–50; F23C 2201/30; F23J 15/006
See application file for complete search history.

(56) References Cited

U.S. PATENT DOCUMENTS

| 1,754,102 A | 4/1930 | Harding |
| 1,821,981 A | 9/1931 | Merz |
| 1,830,635 A | 11/1931 | Bierbower |

(Continued)

FOREIGN PATENT DOCUMENTS

| CA | 2646171 A1 | 6/2010 |
| CH | 196312 A | 3/1938 |

(Continued)

*Primary Examiner* — Laert Dounis
(74) *Attorney, Agent, or Firm* — Armstrong Teasdale LLP

(57) ABSTRACT

A modular boiler system for implementing fuel combustion is provided. The system includes a first boiler and a second boiler of a plurality of boilers, an oxygen input unit, a fuel input unit, a recycled flue gas input unit, and a flue gas separator. The first boiler receives oxygen from the oxygen input unit, fuel from the fuel input unit, and recycled flue gas from the recycled flue gas input unit. The first boiler outputs intra-system flue gas. The flue gas separator separates the intra-system flue gas into a first and second flue gas stream, transfers the first flue gas stream to the second boiler, and transfers the second flue gas stream to a gas cleaning system. The second boiler receives oxygen from the oxygen input unit, fuel from the fuel input unit, and the first flue gas stream from the flue gas separator.

16 Claims, 22 Drawing Sheets

(56) References Cited

U.S. PATENT DOCUMENTS

| | | | |
|---|---|---|---|
| 1,948,940 A | | 2/1934 | Noack |
| 2,968,288 A | | 1/1961 | Zoschak et al. |
| 3,948,223 A | | 4/1976 | Benson |
| 4,145,178 A | | 3/1979 | Egnell et al. |
| 4,659,305 A | * | 4/1987 | Nelson .................. F23C 9/08 431/115 |
| 4,714,032 A | | 12/1987 | Dickinson |
| 4,725,222 A | | 2/1988 | Koch |
| 4,782,765 A | | 11/1988 | Miller et al. |
| 5,906,806 A | * | 5/1999 | Clark .................. F23J 15/006 423/437.1 |
| 7,458,218 B2 | | 12/2008 | Kalina |
| 8,038,746 B2 | * | 10/2011 | Clark .................. C10K 1/024 48/61 |
| 2008/0078122 A1 | * | 4/2008 | Clark .................. F23L 7/007 48/61 |
| 2014/0007576 A1 | | 1/2014 | Alekseev |
| 2015/0013300 A1 | | 1/2015 | Axelbaum et al. |
| 2016/0045841 A1 | | 2/2016 | Kaplan et al. |
| 2017/0363284 A1 | * | 12/2017 | Axelbaum .............. F23L 7/007 |

FOREIGN PATENT DOCUMENTS

| | | |
|---|---|---|
| EP | 2772619 A1 | 9/2014 |
| WO | 2007140261 A2 | 12/2007 |

* cited by examiner

OXY-COMBUSTION PROCESS WITH MODULAR BOILER DESIGN

CROSS-REFERENCE TO RELATED APPLICATIONS

This application claims priority to U.S. Provisional Application No. 62/680,196, filed Jun. 4, 2018, the contents of which are incorporated herein by reference in its entirety.

STATEMENT REGARDING FEDERALLY FUNDED RESEARCH AND DEVELOPMENT

This invention was made with government support under DE-FE0029087 awarded by the U.S. Department of Energy. The government has certain rights in the invention.

BACKGROUND OF THE DISCLOSURE

The field of the disclosure relates generally to fuel combustion systems. More specifically, the field of the disclosure relates to boiler systems for oxy-combustion.

Oxy-combustion is one of the three major strategies for capturing carbon dioxide from stationary combustion furnaces and power plants. The most common oxy-combustion concept is to combust fuel, e.g. pulverized coal, at atmospheric pressure in a stream of oxygen that has been diluted with a large amount of recycled flue gas. The recycled flue gas acts as an inert to reduce the temperature in the boiler and thereby control wall heat flux to within the constraints of the boiler tube materials. Typically, a flue gas recycle ratio of around 70% is required to reduce the oxygen concentration at the inlet of the boiler to around 30%. This means, if the mass flow rate of the final combustion product transferred to gas cleanup equipment is Q, the mass flow rate of the recycled flue gas will be around 2.3 Q. This large amount of flue gas recycle significantly reduces plant efficiency and increases cost.

Accordingly, reducing the flue gas recycle ratio and increasing plant efficiency is desirable.

BRIEF DESCRIPTION OF THE DISCLOSURE

In one aspect, a modular boiler system for implementing fuel combustion is provided. The system comprises an oxygen input unit configured to provide oxygen to a plurality of boilers, a fuel input unit configured to provide fuel to the plurality of boilers, and a recycled flue gas input unit configured to provide recycled flue gas to at least a first boiler of the plurality of boilers. The system further comprises a first boiler configured to receive oxygen from the oxygen input unit, fuel from the fuel input unit, and recycled flue gas from the recycled flue gas input unit. The first boiler is further configured to output intra-system flue gas. The system further comprises a flue gas separator configured to separate the intra-system flue gas into a first flue gas stream and a second flue gas stream. The flue gas separator is further configured to transfer the first flue gas stream to a second boiler of the plurality of boilers and to transfer the second flue gas stream to a gas cleaning system. The system further comprises a second boiler configured to receive oxygen from the oxygen input unit, fuel from the fuel input unit, and the first flue gas stream from the flue gas separator.

In another aspect, a process for implementing fuel combustion using a modular boiler is provided. The process comprises providing oxygen to a plurality of boilers; providing fuel to the plurality of boilers; providing recycled flue gas to at least a first boiler of the plurality of boilers; transferring, from the first boiler, a first flue gas stream to a second boiler of the plurality of boilers; and, transferring, from the first boiler, a second flue gas stream to a gas cleaning system.

In yet another aspect, a burner-combustor is provided for use in a staged pressurized oxy-combustion system with a plurality of modular boilers.

BRIEF DESCRIPTION OF THE DRAWINGS

The following drawings illustrate various aspects of the disclosure.

DETAILED DESCRIPTION OF THE DISCLOSURE

Oxy-combustion is one of the three major strategies for capturing carbon dioxide from stationary combustion furnaces and power plants. The most common oxy-combustion concept is to combust fuel, e.g. pulverized coal, at atmospheric pressure in a stream of oxygen that has been diluted with a large amount of recycled flue gas. The recycled flue gas acts as an inert to reduce the temperature in the boiler and thereby control wall heat flux to within the constraints of the boiler tube materials. However, this large amount of flue gas recycle also reduces plant efficiency and increases cost. With the method in this disclosure, the flue gas recycle ratio is significantly decreased, and thus plant efficiency is increased and cost is reduced. With the modular boiler design, the capital cost of the plant is reduced, since the boiler can be constructed off-site and shipped to the plant site. Also, the modular boiler design provides better plant operating flexibility, because deep turn-down is achieved by either reducing the thermal input of each boiler or shutting down one or more boilers.

The present disclosure is directed to a new staged, oxy-combustion process with a greatly reduced flue gas recycle ratio and a modular boiler design. With a low flue gas recycle ratio, the plant efficiency increases and hence operating costs decrease. With the modular boiler design, the capital cost of the plant is reduced, since the boiler can be constructed off-site and shipped to the plant site. Also, the modular boiler design provides better plant operating flexibility, because deep turn-down is achieved by either reducing the thermal input of each boiler or shutting down one or more boilers. Based on process analysis, when the flue gas recycle ratio decreases from 70% to 30%, the plant efficiency increases by more than 3 percentage points.

Figure 1:
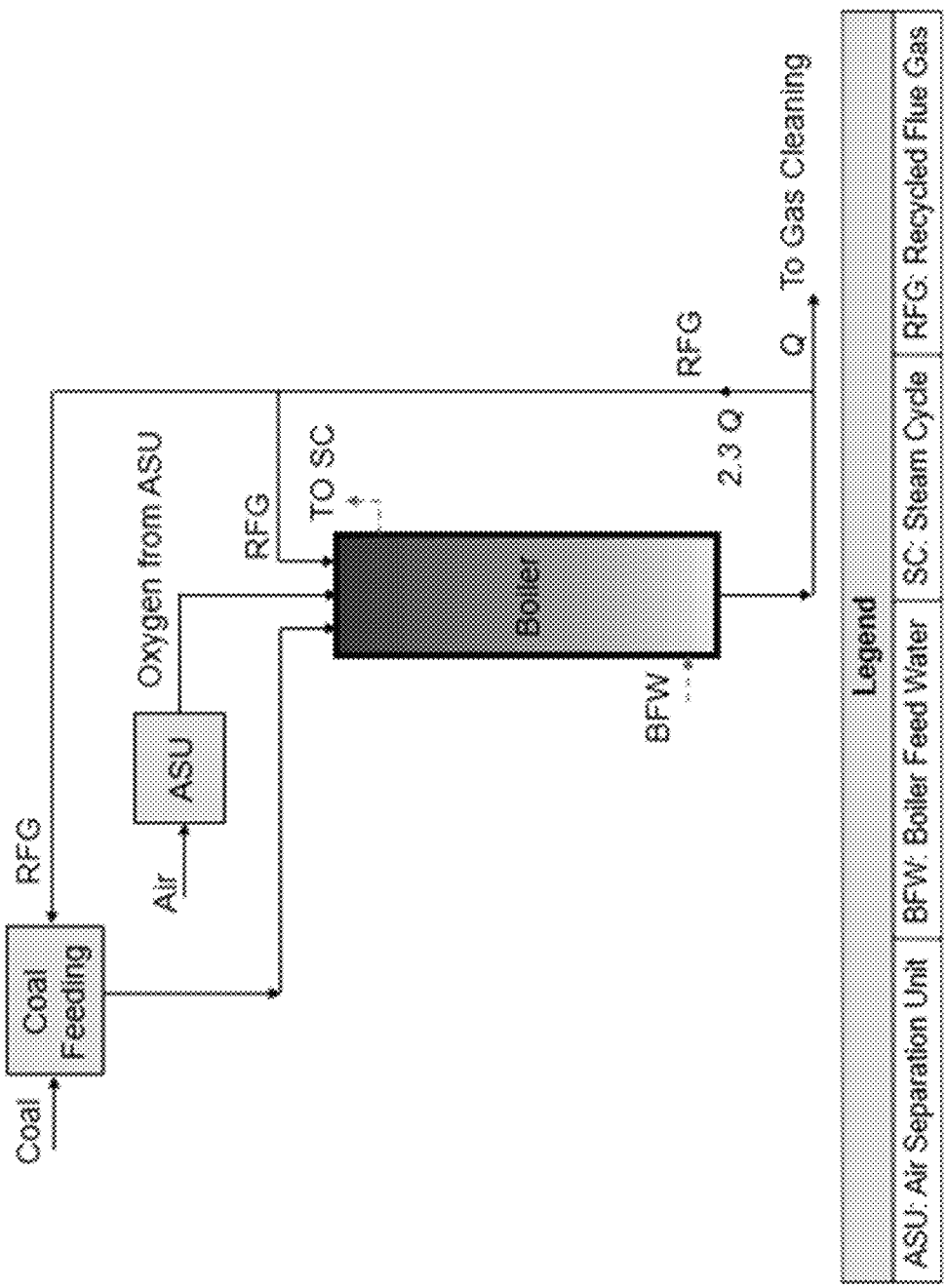
FIG. 1 is an exemplary embodiment of a simplified process flow diagram for a first-generation oxy-coal power plant in accordance with the present disclosure.

FIG. 1 shows a simplified process flow diagram for a first-generation oxy-coal power plant. As shown in FIG. 1, a common oxy-combustion concept is to combust fuel, e.g. pulverized coal, at atmospheric pressure in a stream of oxygen that has been diluted with a large amount of recycled flue gas. The recycled flue gas acts as an inert to reduce the temperature in the boiler and thereby control wall heat flux to within the constraints of the boiler tube materials. Typically, a flue gas recycle ratio of around 70% is required to reduce the oxygen concentration at the inlet of the boiler to around 30%.

Figure 2:
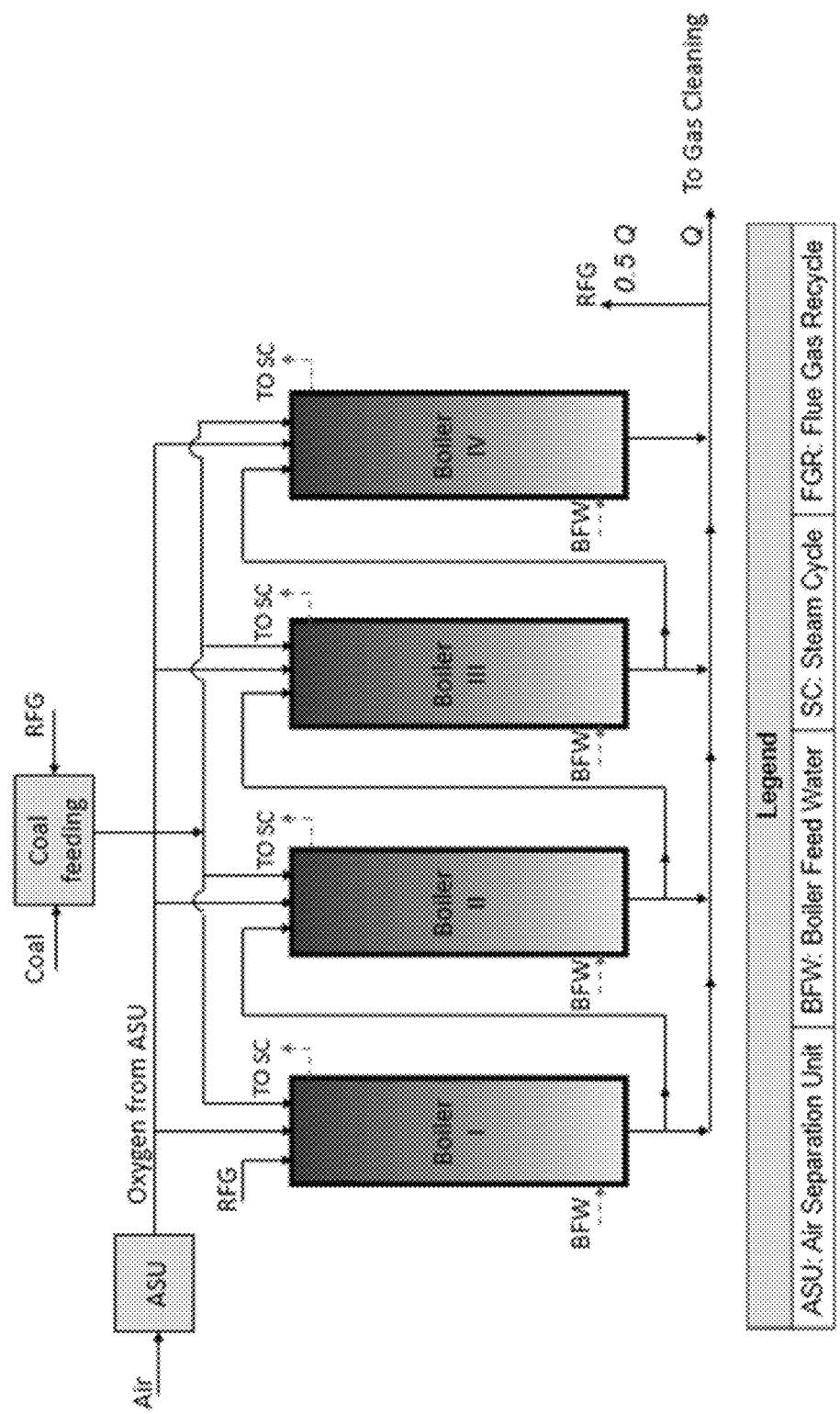
FIG. 2 is an exemplary depiction of a flow diagram for a four-stage, oxy-coal power plant with modular boiler design in accordance with the present disclosure.

FIG. 2 is an exemplary embodiment of a four-stage, oxy-combustion process with a modular boiler design in accordance with the present disclosure. In the process, separate boilers or stages are connected in series, with the fuel (e.g., any fuel, including gaseous fuel or solid fuel) and oxidizer being distributed throughout the stages. A certain amount of recycled flue gas is fed into the first stage to act as an inert gas to reduce the combustion temperature and hence wall heat flux. The partially cooled flue gas of this stage is separated into two streams. One stream is transferred to the next stage, where more fuel and oxygen are fed. This part of flue gas acts as an inert gas to reduce the combustion temperature of the next stage. The other stream flows directly to the gas cleanup equipment downstream. This process is repeated in subsequent stages until all the fuel and nearly all the oxygen is consumed. By adjusting the mass flow rates of the flue gas fed into the second, third and fourth stages, and adjusting the coal and oxygen distributions among stages, in some embodiments, all stages operate at similar conditions, which allows for a modular design for all boilers. The benefits of modular boiler design shown in FIG. 2 include reduced capital cost of the plant, as well as successful achievement of deep turn-down.

For the process shown in FIG. 2, since only the first stage needs recycled flue gas to dilute the oxygen, a flue gas recycle ratio of 33% is all that is necessary to achieve 30% oxygen concentration at the inlet of each boiler. Then, if the mass flow rate of the final combustion product is Q, the mass flow rate of the recycled flue gas is only 0.5 Q, which is only about ⅕th of that in first-generation oxy-combustion plants. Accordingly, the efficiency loss caused by flue gas recycle is reduced by ⅘ths.

It is important to note that by adding more stages, the flue gas recycle ratio is further reduced; hence plant efficiency increases with the number of boiler modules. The larger the plant, the more efficient it is. The concept of staged, oxy-combustion with modular boiler design can be used either in atmospheric pressure oxy-combustion processes or pressurized oxy-combustion processes. The boiler type used in this process is, for example, a pulverized boiler, fluidized boiler, or some other type of boiler. Based on process analysis, when combined with pressurization, which allows for latent heat recovery from the flue gas, in some embodiments, the efficiency of a low-recycle power plant is more than 6 percentage points higher than that of first-generation oxy-combustion plants.

Process analysis has been done which indicates that with the stage-combustion design, the flue gas recycle ratio is significantly reduced. And by adjusting the flue gas flow(s) going into all stages; all stages operate at similar conditions.

EXAMPLES

The following Examples describe or illustrate various embodiments of the present disclosure. Other embodiments within the scope of the appended claims will be apparent to a skilled artisan considering the specification or practice of the disclosure as described herein. It is intended that the specification, together with the Examples, be considered exemplary only, with the scope and spirit of the disclosure being indicated by the claims, which follow the Examples.

Figure 3:
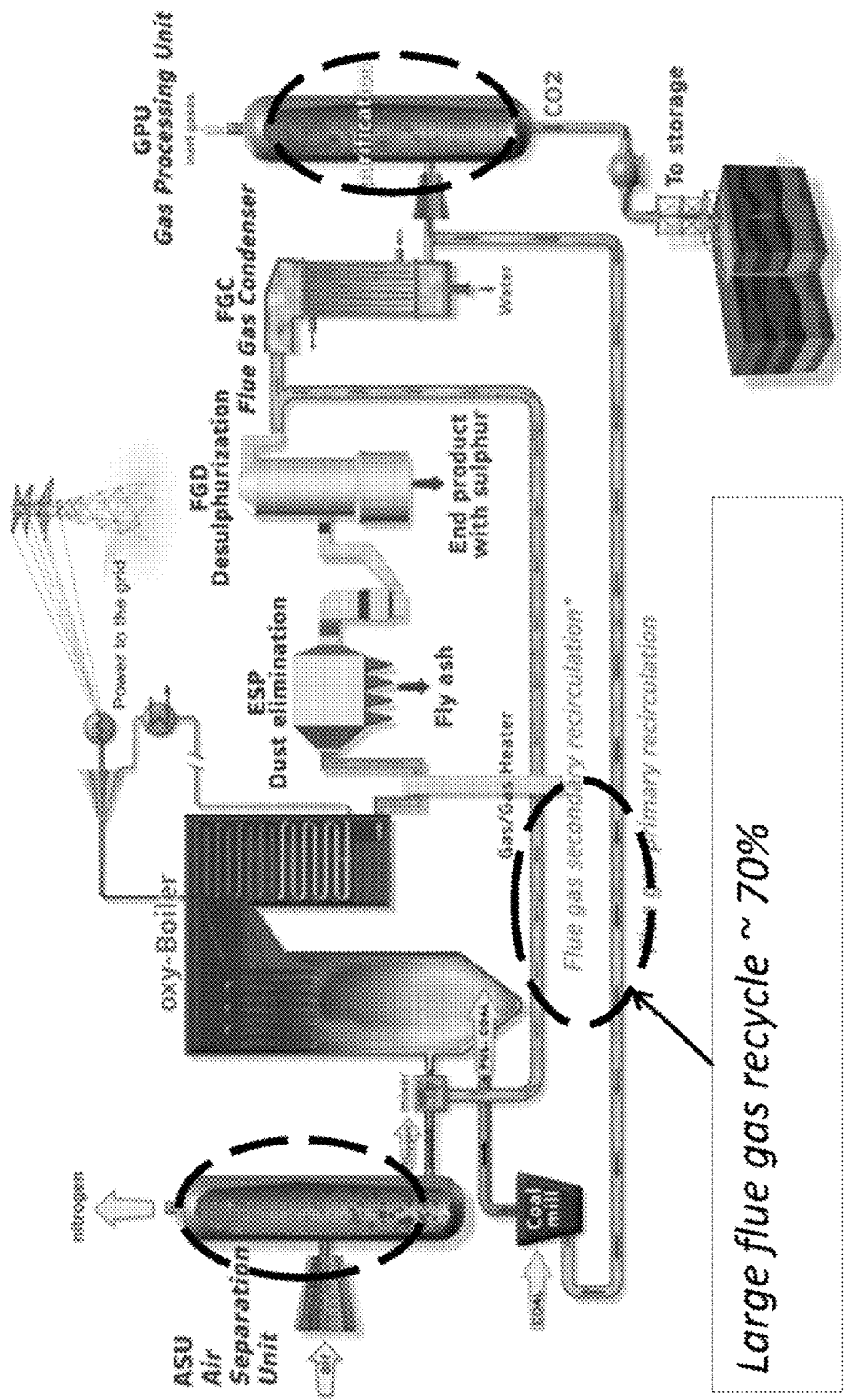
FIG. 3 is an exemplary embodiment of an oxy-combustion system using a large flue gas recycle in accordance with the present disclosure.

For power plants where the intention is to capture $CO_2$, there are efficiency penalties associated with capturing $CO_2$. The main sources of these penalties when employing oxy-combustion include generating $O_2$ (e.g., from an oxygen input unit such as an air separation unit (ASU)) and compressing $CO_2$ (e.g., $CO_2$ purification unit (CPU)). FIG. 3 is an exemplary embodiment of an oxy-combustion system using a large flue gas recycle in accordance with the present disclosure.

It is desirable to design and implement a system that benefits from both $O_2$ generation and $CO_2$ compression. The requirement of high-pressure $CO_2$ for sequestration, coupled with the fact that compressing $CO_2$ downstream takes similar amounts of energy compared with compressing $O_2$ upstream, enables pressurized combustion as a tool to increase efficiency and reduce costs. The primary advantage of pressurized oxy-combustion is the increase in flue gas dew point, such that the moisture condensation can occur at a higher temperature and hence the latent heat can be effectively recovered. Additional benefits of pressurized combustion include the ability to integrate various pollutant removal steps, reduced gas volume, the ability to avoid air ingress, higher partial pressure of oxygen, improved efficiency and reduced cost, such as by reduced equipment size and cost, reduced $CO_2$ purification cost, and improved burnout. Another important benefit of increasing the pressure in a coal combustion system is that an optically dense atmosphere due to the high particle number density can be created and can be utilized as a means to control radiation.

Figure 4:
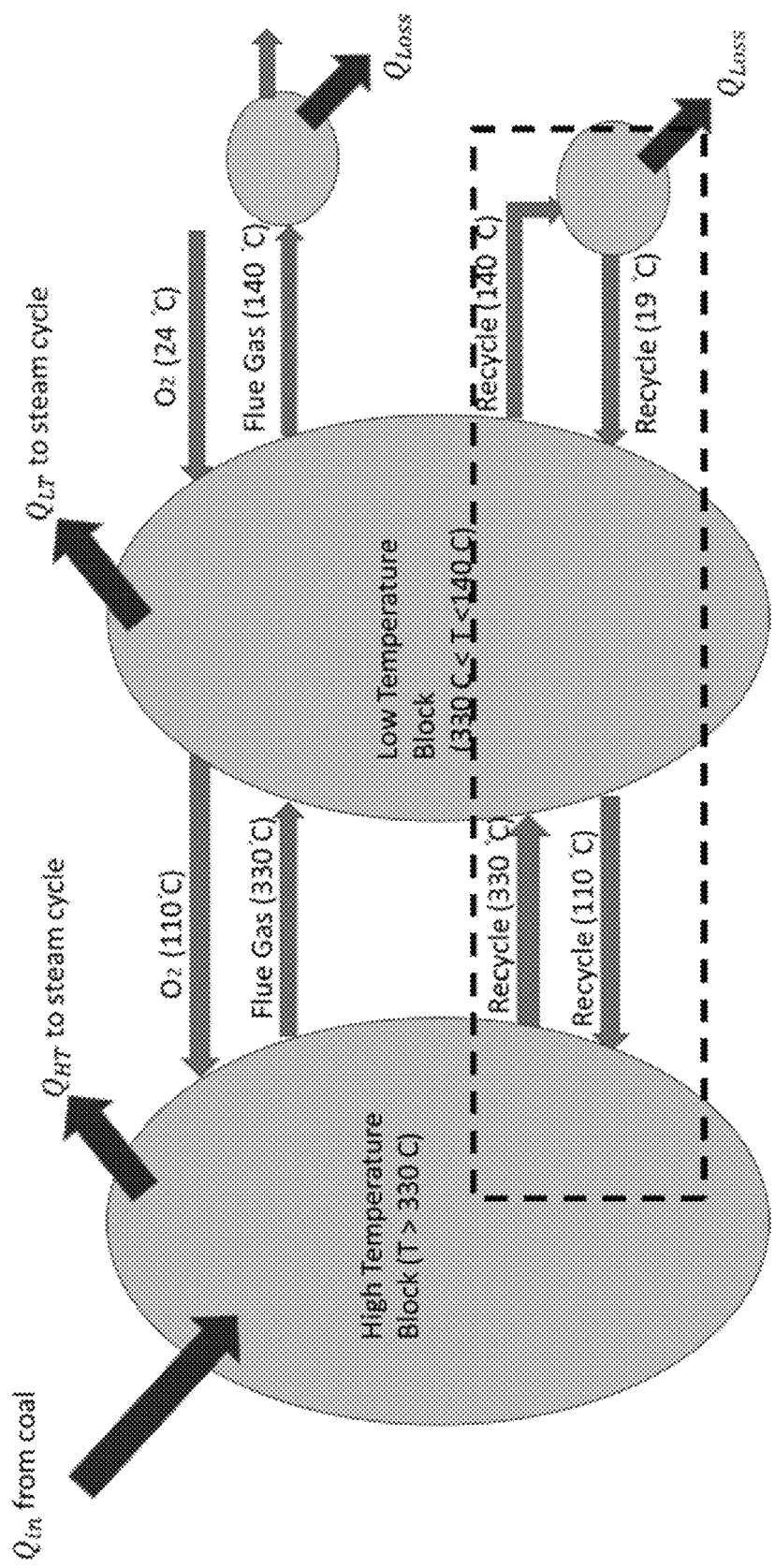
FIG. 4 is an exemplary embodiment of a graphical depiction of recycling to understand the effect of recycle on plant efficiency in accordance with the present disclosure.
Figure 5:
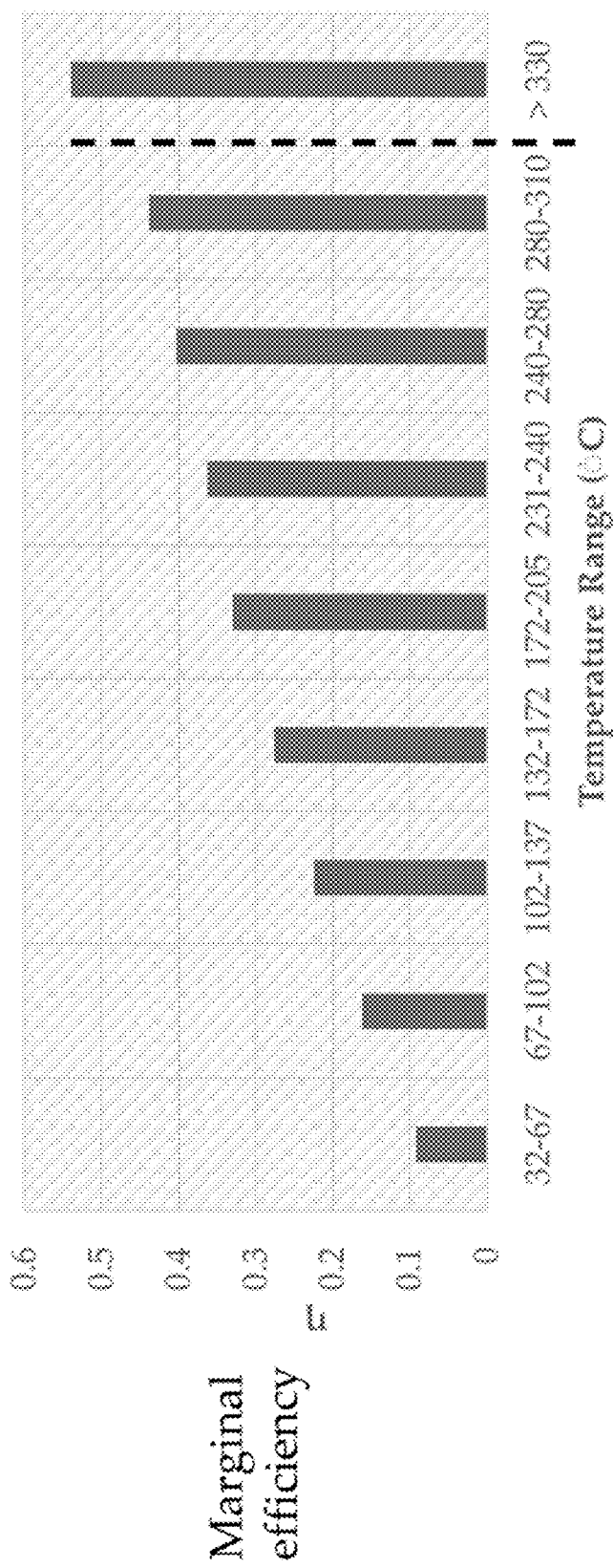
FIG. 5 is an exemplary embodiment of a graphical depiction of fluid temperature versus marginal efficiency associated with the diagram shown in FIG. 4 in accordance with the present disclosure.
Figure 6:
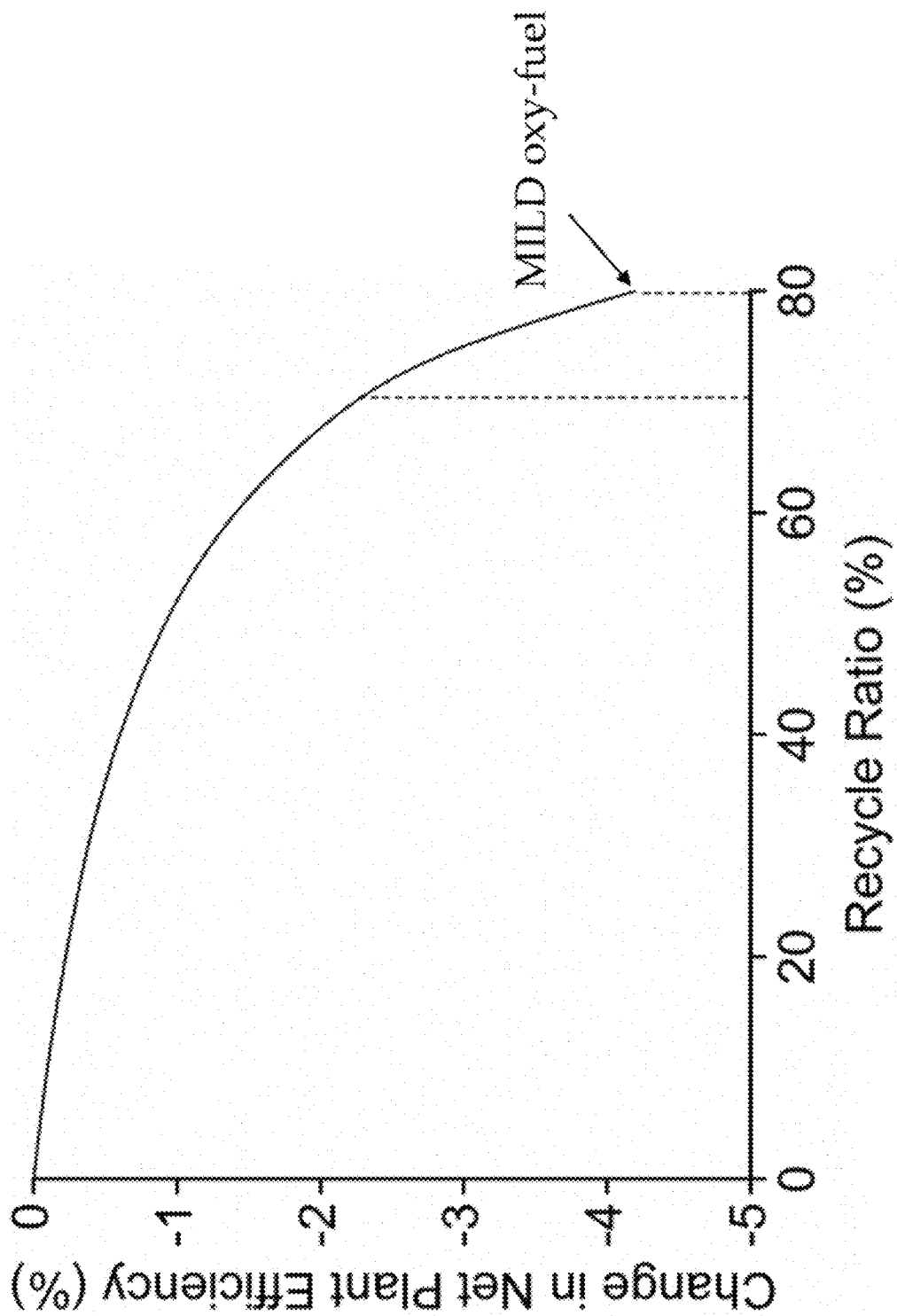
FIG. 6 is an exemplary embodiment of a graphical depiction of recycle ratio versus change in net plant efficiency in accordance with the present disclosure.
Figure 7:
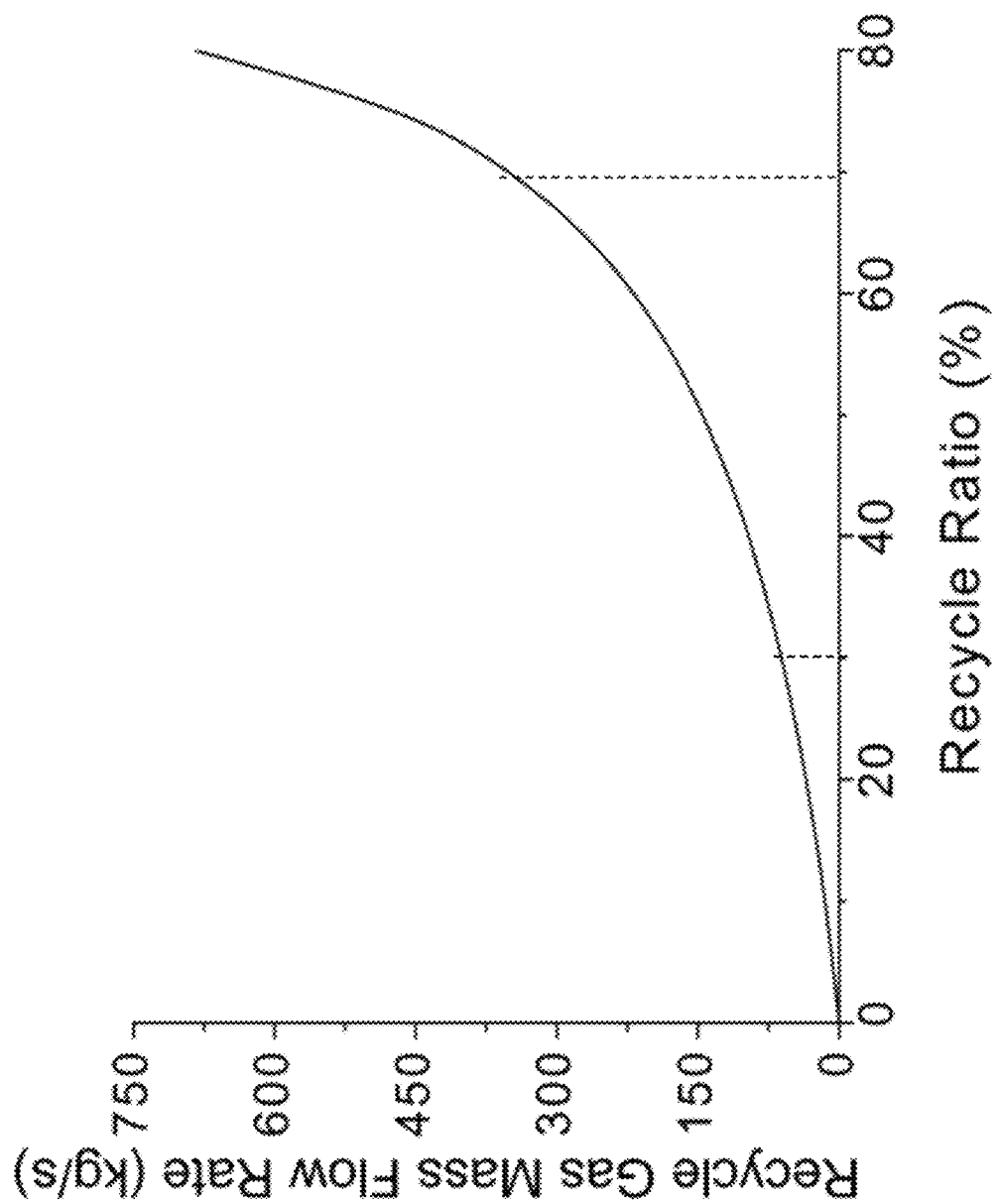
FIG. 7 is an exemplary embodiment of a graphical depiction of recycle ratio versus recycle gas mass flow rate in accordance with the present disclosure.

FIGS. 4-6 support using a process with reduced recycle in order to increase efficiency. FIG. 4 is an exemplary embodiment of a graphical depiction of flue gas recycle in accordance with the present disclosure. FIG. 5 is an exemplary embodiment of a graphical depiction of temperature versus marginal efficiency associated with the diagram shown in FIG. 4 in accordance with the present disclosure. FIG. 6 is an exemplary embodiment of a graphical depiction of recycle ratio versus change in net plant efficiency in accordance with the present disclosure. FIG. 7 is an exemplary embodiment of a graphical depiction of recycle ratio versus recycle gas mass flow rate in accordance with the present disclosure. As seen in FIG. 6, the net plant efficiency drops drastically when flue gas recycle ratio is higher than around 30%.

Figure 8:
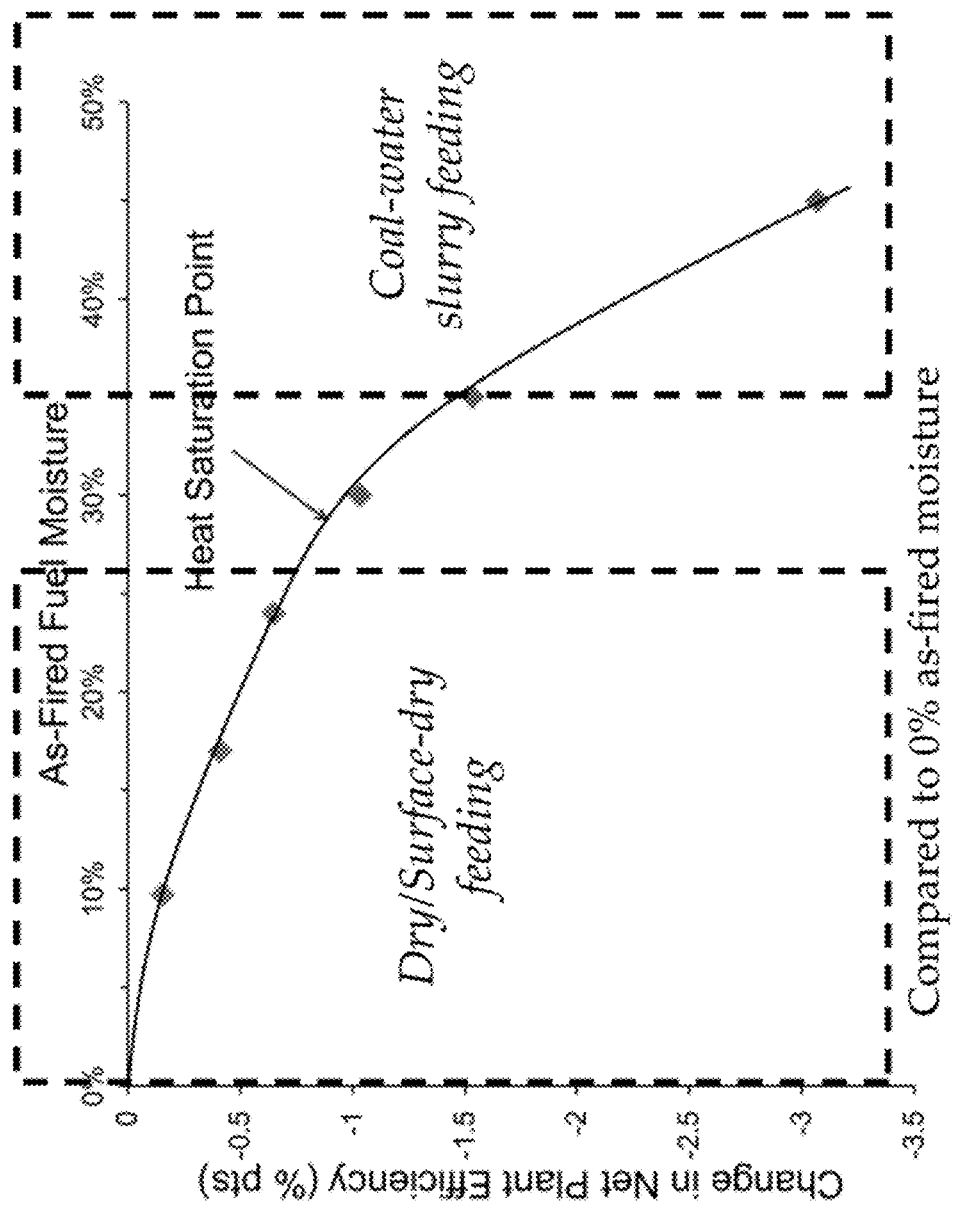
FIG. 8 is an exemplary embodiment of a graphical depiction of as-fired fuel moisture versus change in net plant efficiency in accordance with the present disclosure.

FIG. 8 is an exemplary embodiment of a graphical depiction of as-fired fuel moisture versus change in net plant efficiency in accordance with the present disclosure. With respect to the combustion system described herein, a coal-slurry combustion option decreased plant efficiency. That is, an increase in moisture decreases plant efficiency, especially beyond the heat saturation point. Increasing moisture shifts energy from high grade to lower grade, thus reducing efficiency. Beyond that heat saturation point, additional lower grade heat cannot be integrated.

Figure 9:
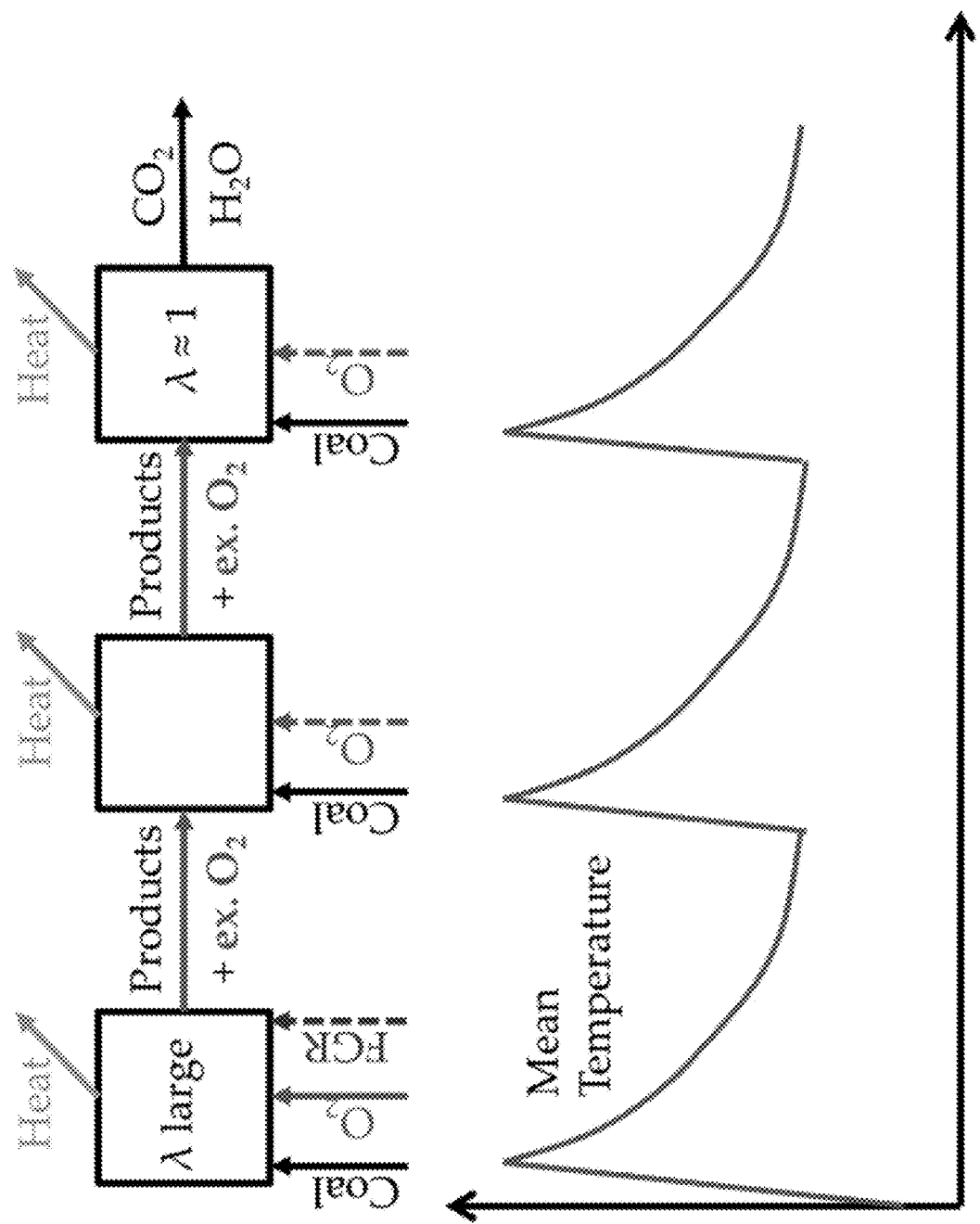
FIG. 9 is an exemplary embodiment of a staged combustion schematic diagram in accordance with the present disclosure.

As described herein, staged combustion is an effective means to reduce recycled gas use for the combustion process. FIG. 9 is an exemplary embodiment of a staged combustion schematic diagram in accordance with the present disclosure. Staging can help control combustion temperature and hence heat flux in low recycle oxy-combustion processes. In some embodiments, other than recycled flue gas (RFG; or flue gas recycle, FGR), excess oxygen can also be injected into the first stage of a staged combustion system. Staging increases the gas-to-fuel (e.g., gas-to-coal) ratio in all stages.

Figure 10:
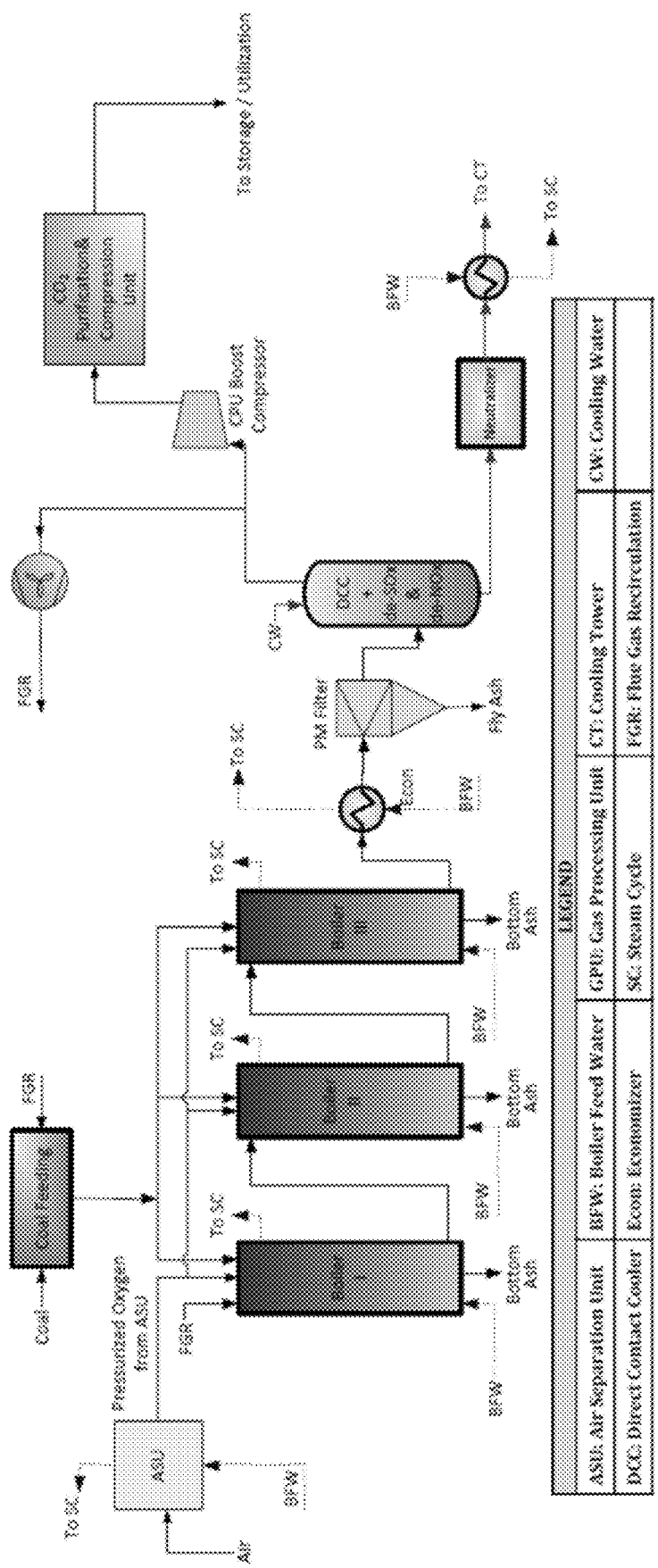
FIG. 10 is an exemplary embodiment of a staged pressurized oxy-combustion (SPOC) process flow diagram in accordance with the present disclosure.

FIG. 10 is an exemplary embodiment of a staged pressurized oxy-combustion (SPOC) process flow diagram in accordance with the present disclosure, which includes air separation, coal feeding, combustion boiler, fly ash filter, flue gas recycle fan, direct contactor column and $CO_2$ purification unit and compression unit. The direct contact column is for removing pollutants such as $SO_x$ and $NO_x$ and recovering latent heat of the moisture in the flue gas. SPOC is an oxy-combustion process with modular boiler design applied to pressurized combustion. Operating conditions of an exemplary SPOC embodiment include surface-moisture free feeding at a 550 $MW_e$ power plant with >90% $CO_2$ capture and exhaust $[O_2] \approx 3\%$ (d.b.)=0.26 bar (partial pressure), as compared to 0.03 bar for atmospheric pressure. Modeling parameters are from DOE/NETL guidelines.

Figure 11:
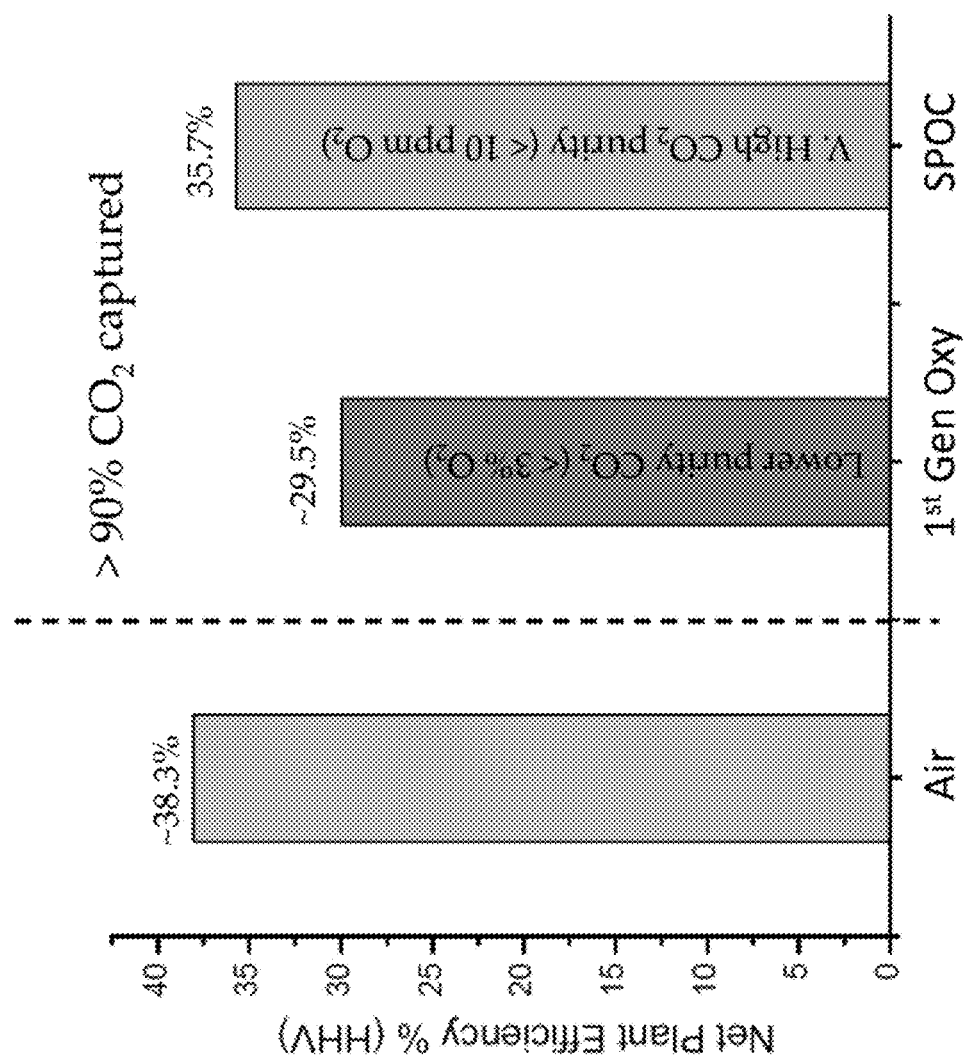
FIG. 11 is an exemplary embodiment of a graphical depiction of various combustion methods versus net plant efficiency in accordance with the present disclosure.

FIG. 11 is an exemplary embodiment of a graphical depiction of various combustion methods versus net plant efficiency in accordance with the present disclosure, for a PRB coal and supercritical steam cycle plant producing 550 $MW_e$ power. The "air" data bar is from IECM and DOE/NETL. The "$1^{st}$ Gen Oxy" data bar is from DOE/NETL 401/093010. As FIG. 11 shows, SPOC exhibits over percentage points over conventional oxy-combustion. The main contributors to efficiency gain include: heat from flue gas moisture condensation, lower energy loss due to reduced flue recycle, auxiliary load reduction due to staging and pressurization, and effective integration of waste heat from oxygen production and compression.

Figure 12:
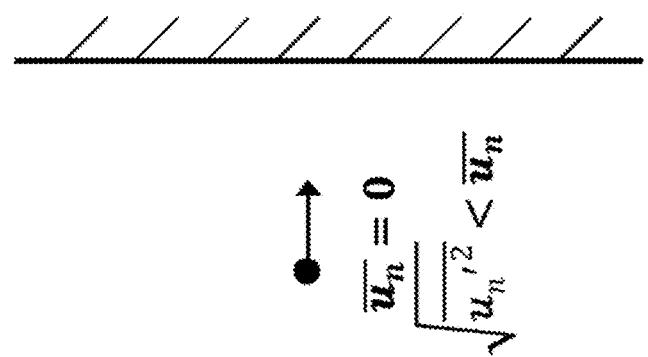
FIG. 12 is an exemplary embodiment of SPOC low-mixing axial flow in accordance with the present disclosure.
Figure 12:
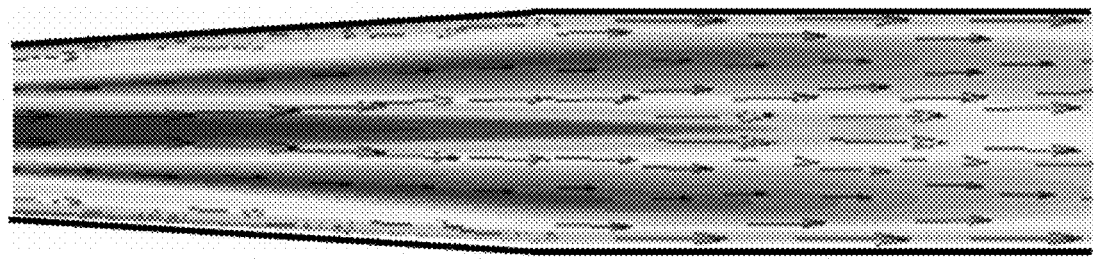
Figure 13:
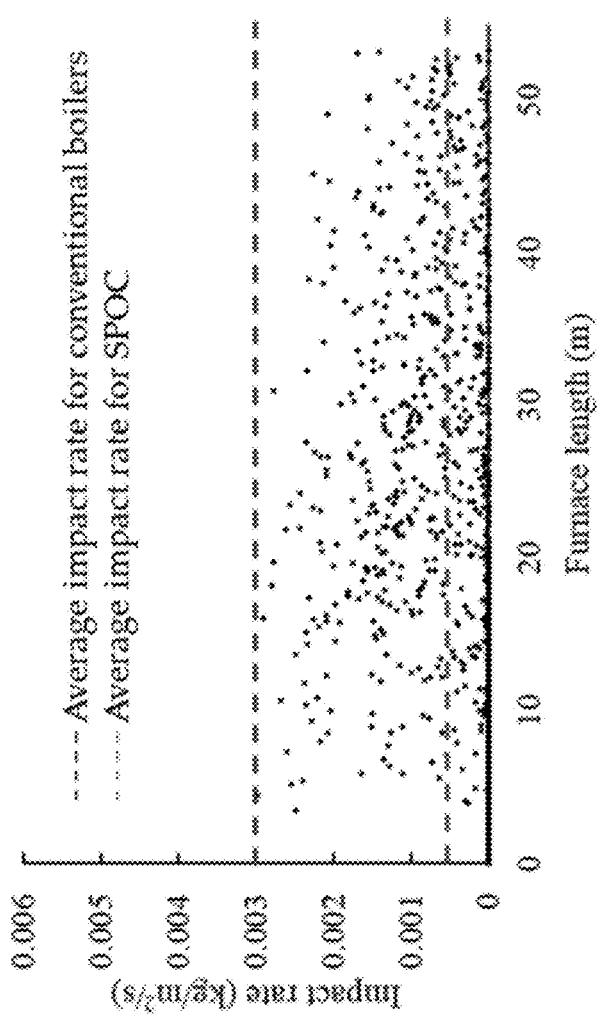
FIG. 13 is an exemplary embodiment of a graphical depiction of furnace length versus impact rate in accordance with the present disclosure.
Figure 14:
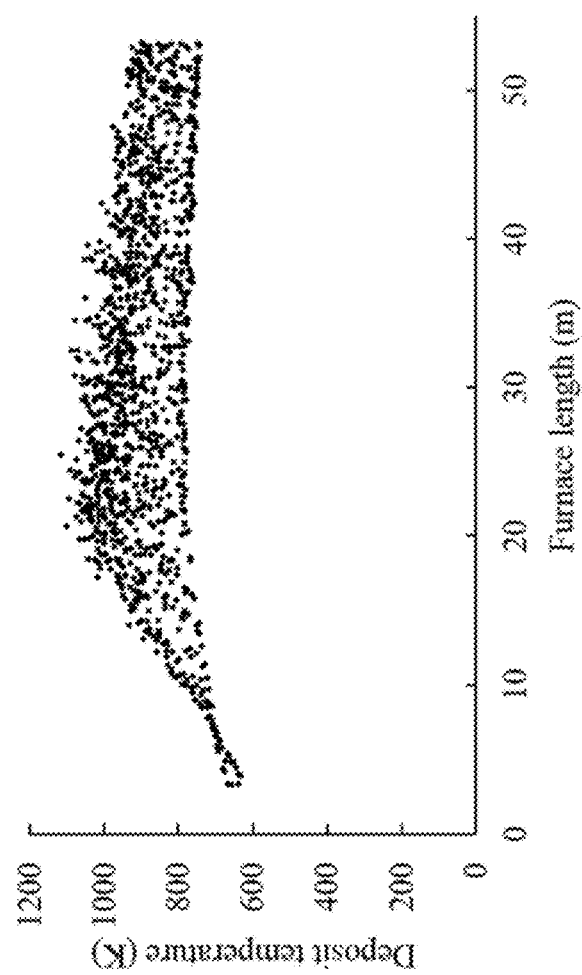
FIG. 14 is an exemplary embodiment of a graphical depiction of furnace length versus deposition temperature in accordance with the present disclosure.

In order to account for the radical differences between a conventional atmospheric pressure boiler and a high-pressure system (e.g., the SPOC system described herein), an axial flow cylindrical burner-combustor with an initial conical section is utilized with the goals of avoiding flame impingement and excessive heat flux, as well as minimizing ash deposition (e.g., slagging and fouling). FIG. 12 is an exemplary embodiment of SPOC low-mixing axial flow in accordance with the present disclosure. FIG. 13 is an exemplary embodiment of a graphical depiction of furnace length versus impact rate in accordance with the present disclosure. FIG. 14 is an exemplary embodiment of a graphical depiction of furnace length versus deposition temperature in accordance with the present disclosure. As FIGS. 12-14 show, eddy impaction and thermophoresis were dominant, the average impaction rate for SPOC was an order of magnitude lower than the average impaction rate for conventional boilers (FIG. 13), and there was sufficient cooling time before impaction (FIG. 14). In accordance with the system disclosed herein, an exemplary pressurized combustion facility was developed. Facility conditions included: pressures up to 15 bar, thermal input up to 100 kW, solid and gaseous fuel testing capability, clear view of near-burner (flame) region, and the ability to test multiple burners and multiple burner configurations. Further, diagnostics included: temperature profile, high speed camera, heat flux, particle/gas sampling, laser transmission for soot/ash measurement, and Fourier-transform infrared spectroscopy (FTIR).

Figure 15:
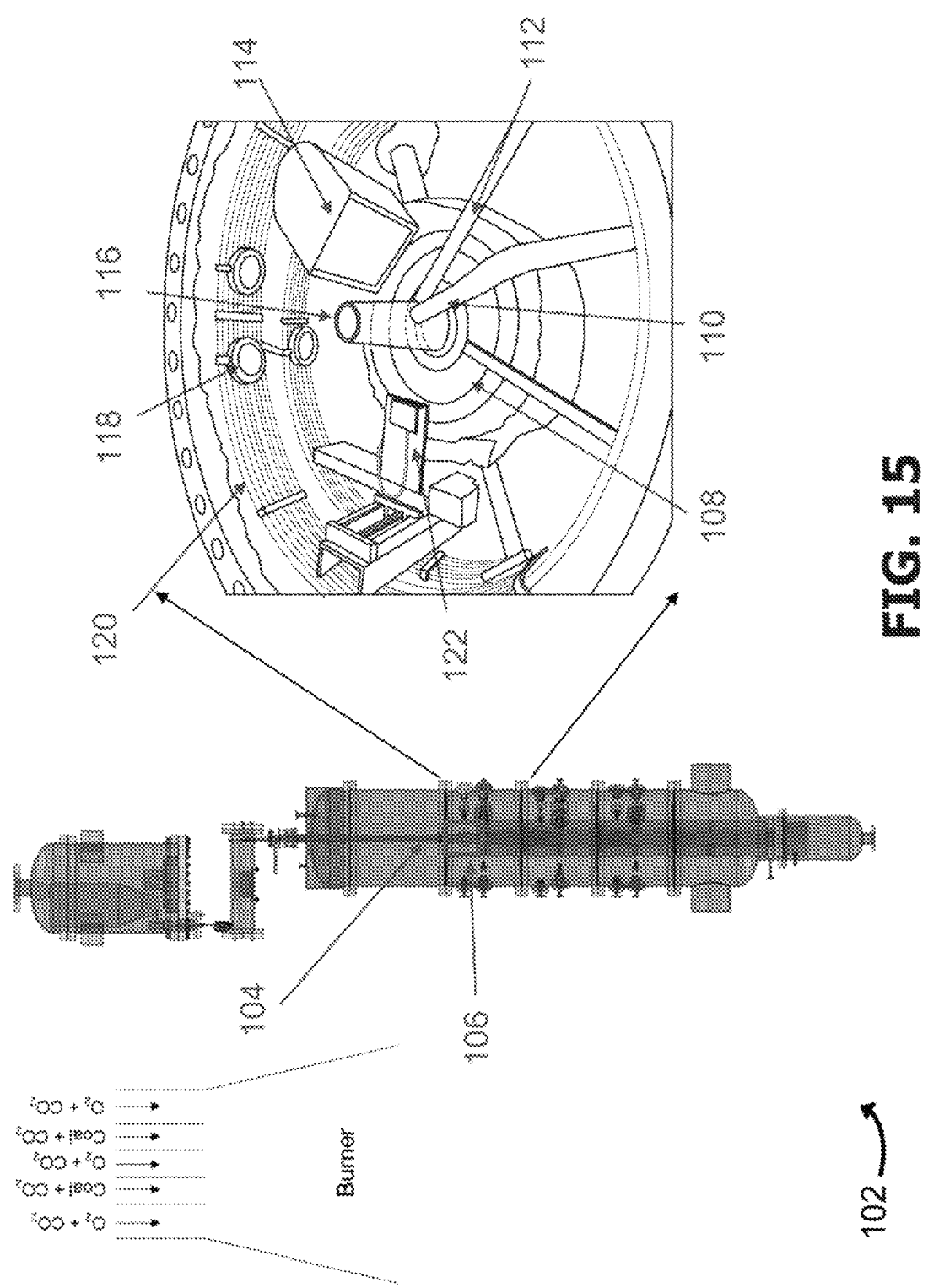
FIG. 15 is an exemplary embodiment of a schematic diagram and associated image of a portion of a pressurized combustion facility in accordance with the present disclosure.

FIG. 15 is an exemplary embodiment of a schematic diagram and associated image of a portion of a pressurized combustion facility in accordance with the present disclosure. In the schematic diagram burner-combustor 102 includes burner nozzle 104 and quartz section 106. In the associated image, burner-combustor 102 includes refractory section 108, ignitor 110, sampling tube 112, camera 114, quartz section 116, lights 118, cooling coils 120, and laser output 122. In this embodiment, the laser output 122 is on a 2-D translation stage.

Various other equipment for the exemplary pressurized combustion facility included a combustor, coal feed system, updated controls and data acquisition system, and updated ignition system. Various tests for the exemplary pressurized combustion facility included: an initial test at atmospheric pressure, coal test with gaseous fuel support at low pressure (<3 bar), coal test without gaseous fuel support and heated wall (stand-alone burner without pilot), high pressure test (up to 15 bar), gas and particle sampling, and narrow angle radiation measurement.

Figure 16C:
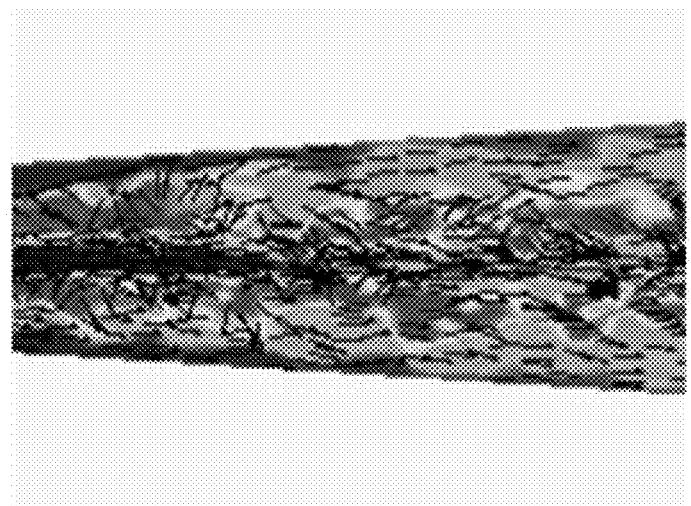
FIGS. 16A-C are exemplary embodiments of experimental and simulated images of flame shape and flow field in accordance with the present disclosure.
Figure 16B:
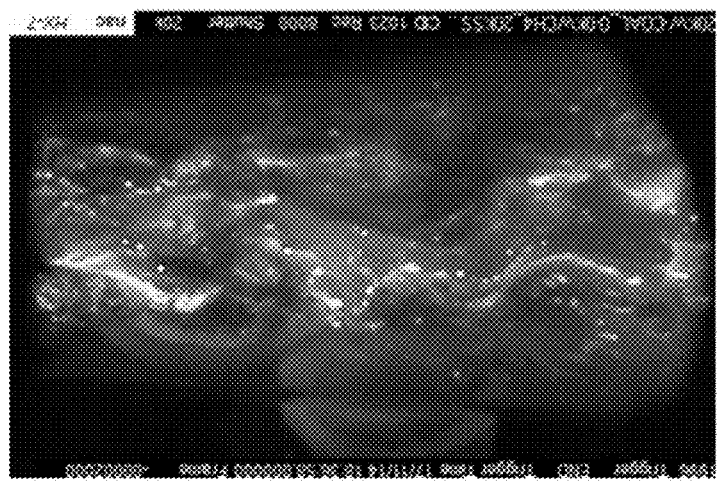
Figure 16A:
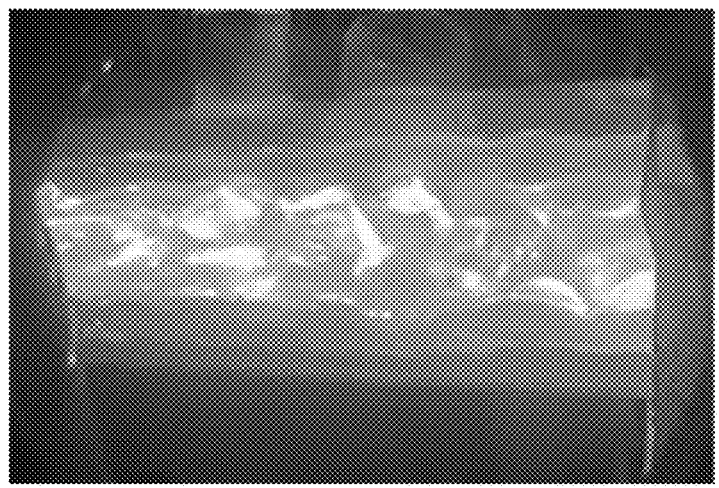

FIGS. 16A-C are exemplary embodiments of experimental and simulated images of flame shape and flow field in accordance with the present disclosure and associated with the exemplary pressurized combustion facility. FIGS. 16A and 16B are still images associated with normal video and high-speed video, respectively. FIG. 16C is a still image associated with a LES simulation. Experiments (coal-$O_2$/$CO_2$) from 1 bar to 15 bar showed similar characteristics and qualitative agreement was achieved between experiments and simulations in terms of flame shape and flow field. LES simulation also showed low ash deposition propensity.

Given the above data, Staged Pressurized Oxy-Combustion (SPOC) promises to be a high efficiency power generation process with carbon capture. High efficiency can be obtained through low flue gas recycle, as well as through valorization of the latent heat of flue gas moisture. Consequently, a SPOC process with modular boiler design is proposed herein. The key considerations for a low-recycle pressurized oxy-combustion burner-combustor include: high pressure, low-recycle (high temperature (T) flame), and minimized ash deposition (e.g., slagging and fouling). With respect to the high pressure consideration, the design for a pressure vessel is cylindrical with a high aspect ratio (minimal diameter to height ratio is ⅙, preferable 15 and above). To avoid excessive wall heat flux due to enhanced radiation by pressure, it is desirable to design the flame with distributed heat release over the length of the vessel which can be achieved by a low mixing axial flow system, and to control soot formation. With respect to the low-recycle (high T flame) consideration, it is desirable to avoid flame impingement, to avoid excessive heat flux, to control oxygen concentration next to boiler tubes, and to control soot formation.

Figures 17, 18:
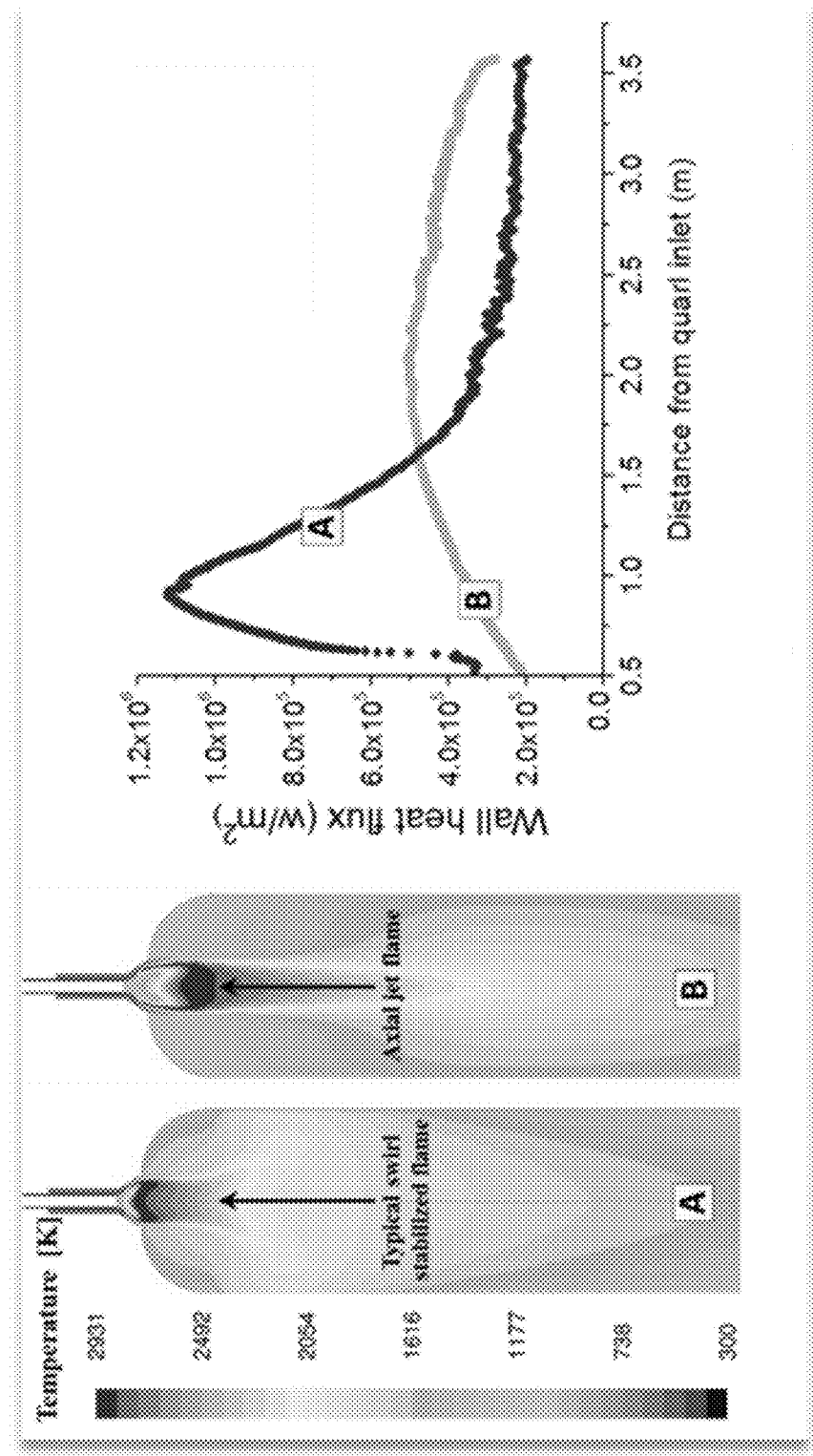
FIG. 17 is an exemplary embodiment of temperature distributions for a typical swirl stabilized flame and an axial jet flame in accordance with the present disclosure.
FIG. 18 is an exemplary embodiment of a graphical depiction of distance from quarl inlet versus wall heat flux for the typical swirl stabilized flame and axial jet flame shown in FIG. 17 in accordance with the present disclosure.
Figure 19:
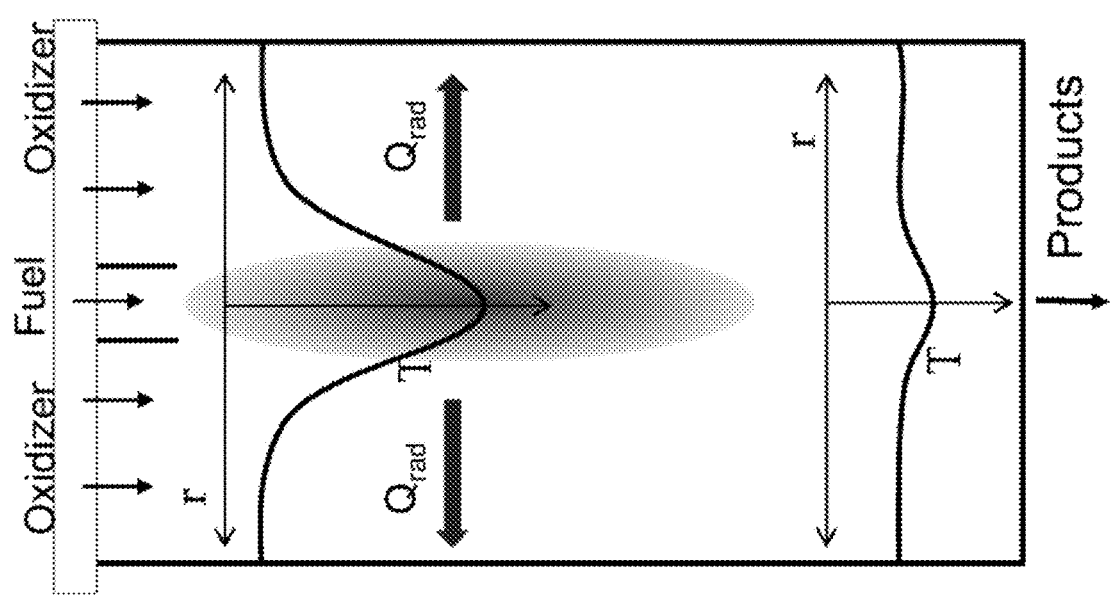
FIG. 19 is an exemplary embodiment of a graphical depiction of the conditions inside a modular boiler in accordance with the present disclosure.

FIG. 17 is an exemplary embodiment of temperature distributions for a typical swirl stabilized flame and an axial jet flame in accordance with the present disclosure. FIG. 18 is an exemplary embodiment of a graphical depiction of distance from quarl inlet versus wall heat flux for the typical swirl stabilized flame and axial jet flame shown in FIG. 17 in accordance with the present disclosure. FIG. 19 is an exemplary embodiment of a graphical depiction of the conditions inside a modular boiler in accordance with the present disclosure. As discussed above, flame impingement and heat release are important considerations. FIGS. 17-19 show that axial flow with low mixing avoids flame impingement and provides for a long combustion zone for distributed heat release. External recirculation is avoided by control of the Thring-Newby parameter:

$$\theta' = \frac{d'_0}{d_1}\left(\frac{\rho_0}{\rho_1}\right)^{0.5}\frac{m_0 + m_1}{m_0}.$$

Figures 20, 21:
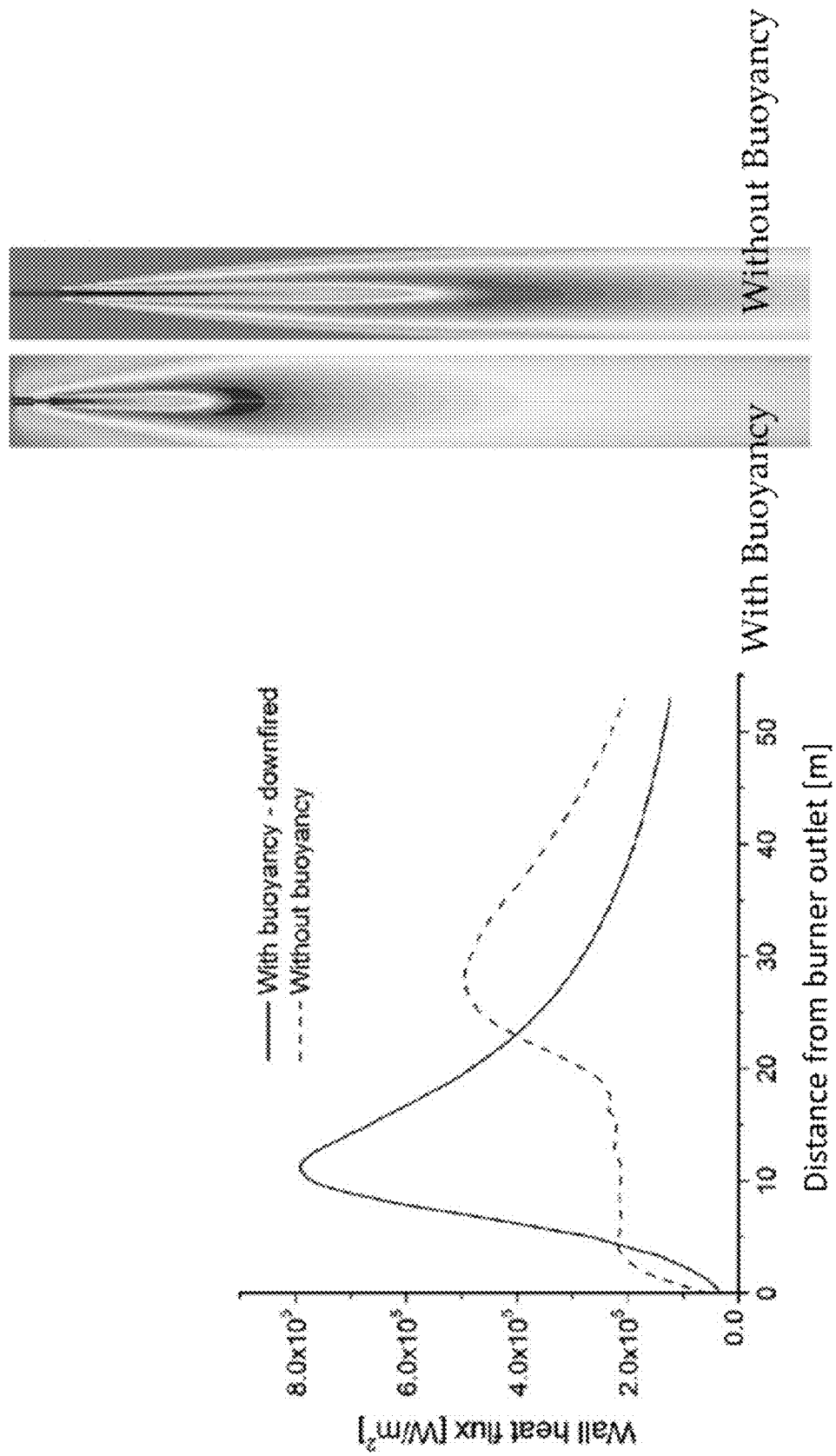
FIG. 20 is an exemplary embodiment of a graphical depiction of distance from burner outlet versus wall heat flux in accordance with the present disclosure.
FIG. 21 is an exemplary embodiment of temperature distributions with and without buoyancy in accordance with the present disclosure.

In order to design a burner and boiler for this process, the first thing to consider is that it is a pressurized combustor, hence a cylindrical design is most appropriate. Secondly, it is a low recycle system, the flame temperatures are quite high, and avoiding flame impingement and having a long combustion zone for distributed heat release are desirable. An example of a high mixing swirl system with a low mixing axial flow system is shown in FIGS. 17-19. Desirable combustion system characteristics include: high temperature flame due to reduced flue gas recycle, cylindrical geometry with high aspect ratio, inability to fire from side walls like atmospheric pressure combustors, and an ability to down-fire to avoid ash falling on the burners. FIG. 20 is an exemplary embodiment of a graphical depiction of distance from burner outlet versus wall heat flux in accordance with the present disclosure. FIG. 21 is an exemplary embodiment of temperature distributions with and without buoyancy in accordance with the present disclosure. Due to the long flame, reducing buoyancy effects is desirable. For a high temperature down-fired flame, buoyancy will push the flame up and towards the wall, potentially leading to flame impingement and/or excessively high heat flux (see FIGS. 20 and 21). Reducing buoyancy effects can be achieved by ensuring the Richardson number is lower than 1. The Richardson number defines buoyancy vs convection:

$$Ri_x = g\beta(T_{hot} - T_{surr})\frac{x}{y^2}$$

Figures 22A, 22B:
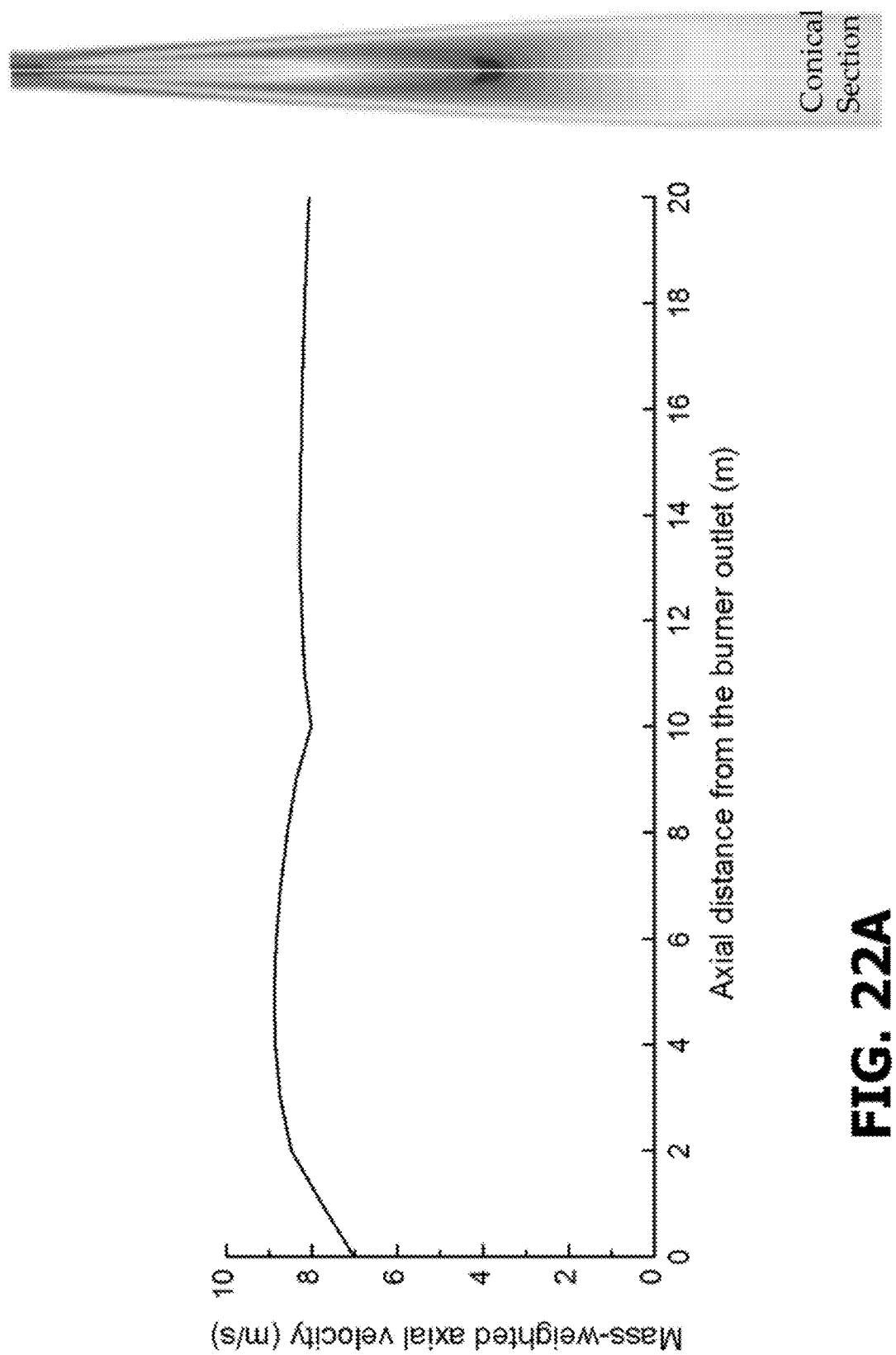
FIG. 22A is an exemplary embodiment of a graphical depiction of axial distance from burner outlet versus mass-weighted axial velocity in accordance with the present disclosure.
FIG. 22B is an exemplary embodiment of a temperature distribution associated with the graphical depiction shown in FIG. 22A in accordance with the present disclosure.

The gas flow rate increases due to 1) an increase in temperature T and 2) coal devolatilization. Therefore, reducing inlet size of the reactor increases axial velocity y. FIG. 22A is an exemplary embodiment of a graphical depiction of axial distance from burner outlet versus mass-weighted axial velocity in accordance with the present disclosure. FIG. 22A shows that the geometry expansion compensates for gas volume expansion and leads to a relatively uniform gas velocity in the conical section. FIG. 22B is an exemplary embodiment of a temperature distribution associated with the graphical depiction shown in FIG. 22A in accordance with the present disclosure. At full scale cone only forms a small part of the overall vessel and doesn't compromise on overall heat transfer surface area.

It is also desirable to minimize fouling and slagging on the wall. The axial flow with fuel staging significantly reduces the deposition rate, as well as slagging. In some embodiments, a high temperature vertical reactor creates buoyancy influenced flame shortening and bulging to the walls. A way to avoid this is to design the initial section as a cone, with the low diameters and high velocities at the inlet to the boiler, such that the Richardson number is low. With the evolution and heating up of gases along the reactor, the diameter of the boiler can be increased such that the velocity remains relatively constant and the Richardson number is low.

Figure 23:
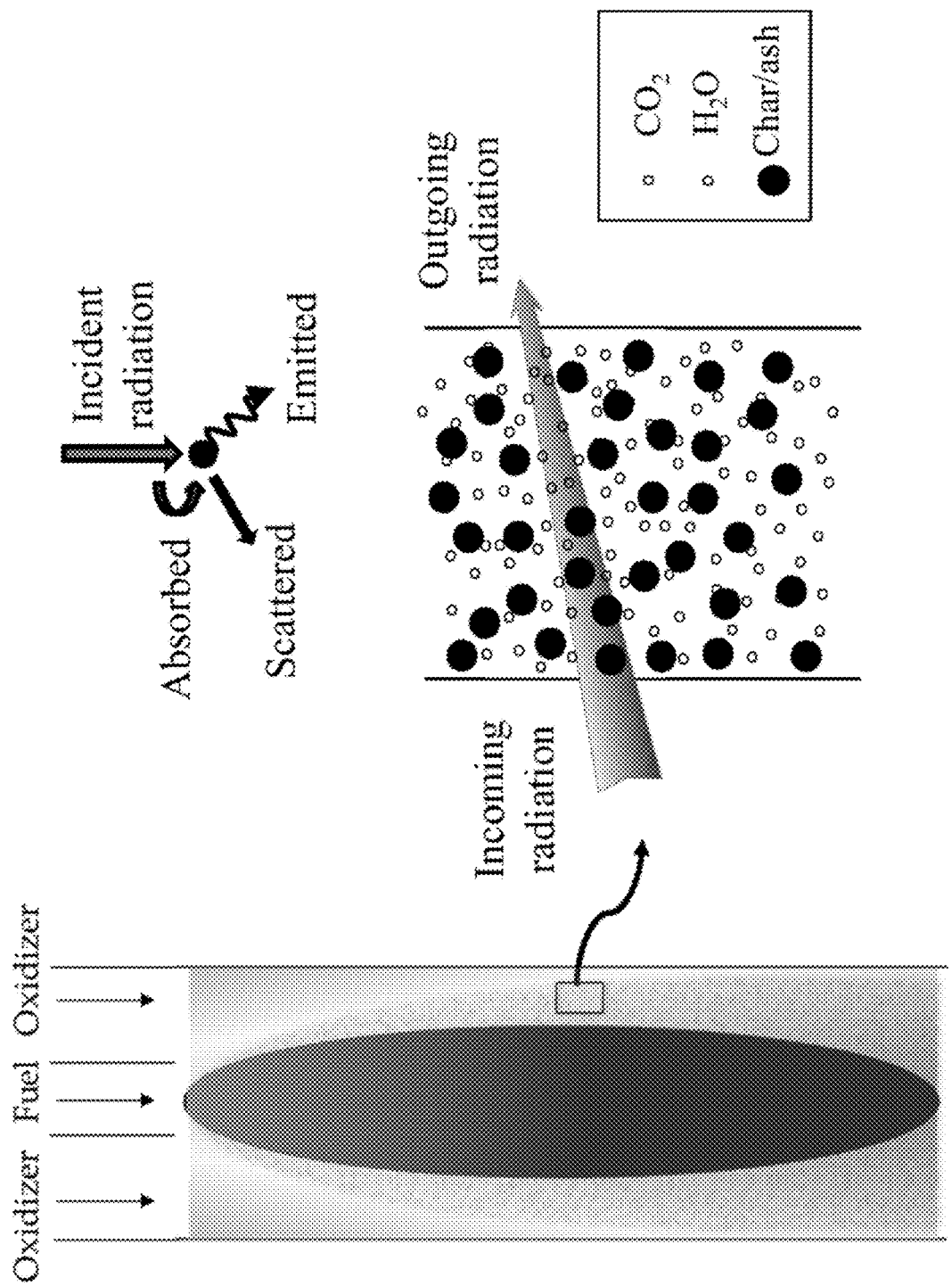
FIG. 23 is an exemplary embodiment of an illustration of radiative trapping in an axial flow combustion case in accordance with the present disclosure.

Moreover, as discussed above, it is desirable to avoid the high heat flux from a very high flame temperature that is due to low recycle. FIG. 23 is an exemplary embodiment of an illustration of radiative trapping in an axial flow combustion case in accordance with the present disclosure. Radiative trapping is utilized based on the impact of trapping on radiative heat flux.

Figure 24:
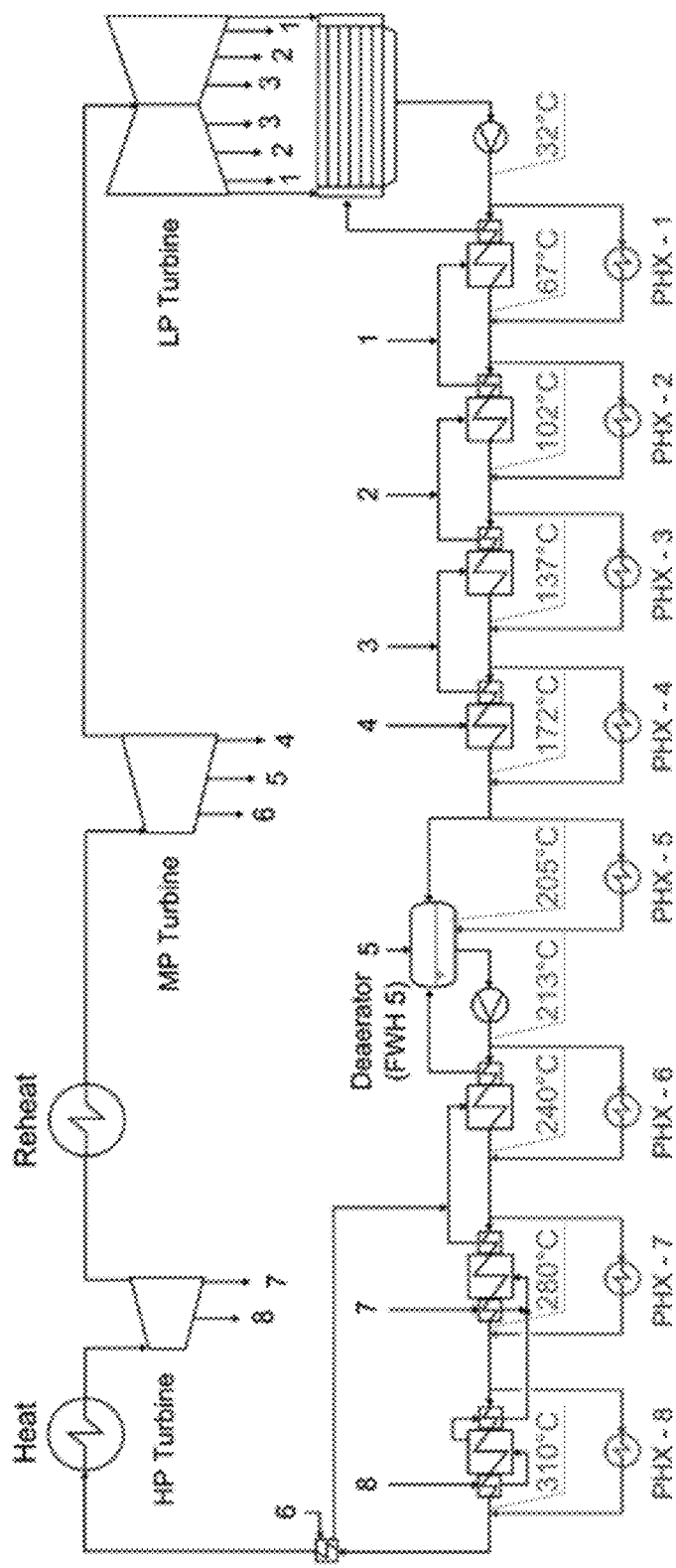
FIG. 24 is an exemplary embodiment of a steam cycle in accordance with the present disclosure.

FIG. 24 is an exemplary embodiment of a steam cycle in accordance with the present disclosure. In some embodiments, a design basis for the system includes: net power output of ~550 MW$_e$, combustion pressure: 232 psig (16 bar), steam: 3500 psig/1100° F./1100° F. (241 bar/593° C./593° C.), a generic midwest location, ISO ambient conditions, coals: PRB sub-bituminous, $CO_2$ recovery: 90%, $CO_2$ purity: EOR grade (<10 ppm $O_2$), and adherence to DOE/NETL guidelines (QGESS) and baseline (DOE/NETL 401/093010).

Figure 25B:
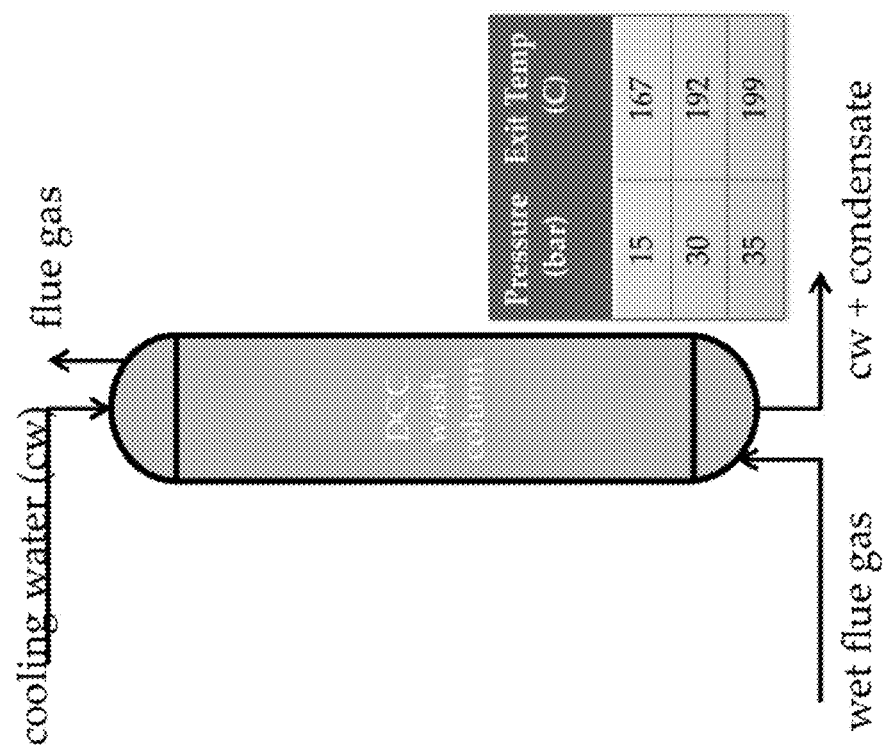
FIG. 25B is an exemplary embodiment of a schematic diagram of a DCC wash column associated with the graphical depiction shown in FIG. 25A in accordance with the present disclosure.
Figure 25A:
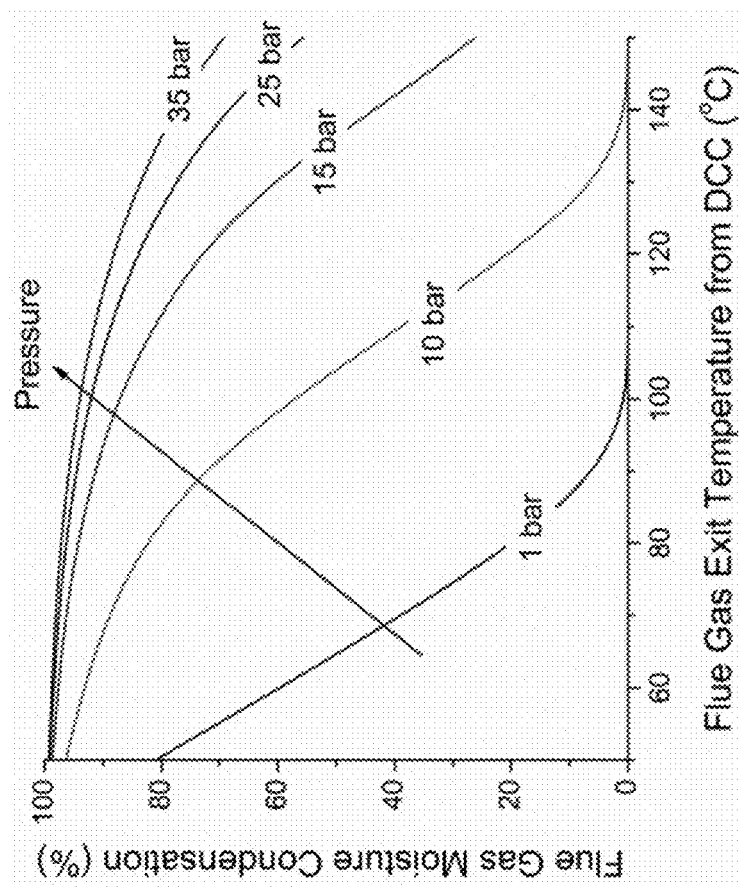
FIG. 25A is an exemplary embodiment of a graphical depiction of flue gas exit temperature from DCC versus flue gas moisture condensation in accordance with the present disclosure.

With respect to the system disclosed herein, pressure effects are reduced beyond a pressure of 16 bar. FIG. 25A is an exemplary embodiment of a graphical depiction of flue gas exit temperature from DCC versus flue gas moisture condensation in accordance with the present disclosure. FIG. 25B is an exemplary embodiment of a schematic diagram of a DCC wash column associated with the graphical depiction shown in FIG. 25A in accordance with the present disclosure. FIGS. 25A and 25B show that an increase in plant efficiency with pressure is not significant above 16 bar.

What is claimed is:

1. A modular boiler system for implementing fuel combustion, the system comprising:
    an oxygen stream configured to provide oxygen to a plurality of boilers;
    a fuel stream configured to provide fuel to the plurality of boilers;
    a recycled flue gas stream configured to provide recycled flue gas to a first boiler of the plurality of boilers;
    the first boiler of the plurality of boilers configured to receive oxygen from the oxygen stream, fuel from the fuel stream, and recycled flue gas from the recycled flue gas stream; wherein the first boiler of the plurality of boilers is further configured to output a stream to a power generation cycle and an intra-system flue gas stream;
    a flue gas separator configured to separate the intra-system flue gas stream into a first flue gas stream and a second flue gas stream; wherein the flue gas separator is further configured to transfer the first flue gas stream to a second boiler of the plurality of boilers and to transfer the second flue gas stream to a gas cleaning systems, wherein the second boiler of the plurality of boilers is downstream from the first boiler of the plurality of boilers, and wherein each boiler of the plurality of boilers is separately connected to the gas cleaning system; and
    the second boiler of the plurality of boilers configured to receive oxygen from the oxygen stream, fuel from the fuel stream, and the first flue gas stream from the flue gas separator.

2. The modular boiler system of claim 1, wherein the modular boiler system is pressurized.

3. The modular boiler system of claim 2, wherein the modular boiler system pressure is about 16 bar or less.

4. The modular boiler system of claim 1, wherein the oxygen provided to the plurality of boilers comprises an oxygen concentration of from about 25% to about 50%.

5. The modular boiler system of claim 1, wherein the recycled flue gas is provided to at least the first boiler of the plurality of boilers at a recycle ratio of about 30% or less.

6. The modular boiler system of claim 1, wherein the fuel provided to the plurality of boilers is coal.

7. The modular boiler system of claim 1, wherein the plurality of boilers are connected in series.

8. The modular boiler system of claim 1, further comprising at least one cylindrical geometry, axial flow burner-combustor.

9. A process for implementing fuel combustion within a modular boiler system, the process comprising:
    providing oxygen to a plurality of boilers;
    providing fuel to the plurality of boilers;
    providing recycled flue gas to at least a first boiler of the plurality of boilers;
    transferring, from the first boiler of the plurality of boilers, an intra-system flue gas stream to a flue gas separator configured to separate the intra-system flue gas stream into a first flue gas stream and a second flue gas stream;
    transferring, from the flue gas separator, the first flue gas stream to a second boiler of the plurality of boilers; and,
    transferring, from the flue gas separator, the second flue gas stream to a gas cleaning system, wherein the second boiler of the plurality of boilers is downstream from the first boiler of the plurality of boilers, and wherein each boiler of the plurality of boilers is separately connected to the gas cleaning system.

10. The process of claim 9, further comprising pressurizing the modular boiler system.

11. The process of claim 10, wherein pressurizing the modular boiler system comprises pressurizing the modular boiler system to a pressure of about 16 bar or less.

12. The process of claim 9, wherein providing oxygen to the plurality of boilers comprises providing oxygen to the plurality of boilers at an oxygen concentration of about 25% to about 50%.

13. The process of claim 9, wherein providing recycled flue gas to at least the first boiler of the plurality of boilers comprises providing recycled flue gas to at least the first boiler of the plurality of boilers at a recycle ratio of about 30% or less.

14. The process of claim 9, wherein providing fuel to the plurality of boilers comprises providing coal to the plurality of boilers.

15. The process of claim 9, further comprising connecting the plurality of boilers in series.

16. The process of claim 9, further comprising operating the plurality of boilers under the same operating conditions.

* * * * *